(12) United States Patent
Iao et al.

(10) Patent No.: US 10,204,487 B2
(45) Date of Patent: Feb. 12, 2019

(54) SYSTEM AND METHOD FOR GAMING

(71) Applicant: United Intellectuals International Limited, Wanchai (HK)

(72) Inventors: Chi Lam Iao, Taipa (MO); Hong Ip, Taipa (MO)

(73) Assignee: UNITED INTELLECTUALS INTERNATIONAL LIMITED, Wanchai (HK)

( * ) Notice: Subject to any disclaimer, the term of this patent is extended or adjusted under 35 U.S.C. 154(b) by 140 days.

(21) Appl. No.: 15/127,621

(22) PCT Filed: Feb. 13, 2015

(86) PCT No.: PCT/CN2015/072995
§ 371 (c)(1),
(2) Date: Sep. 20, 2016

(87) PCT Pub. No.: WO2015/143965
PCT Pub. Date: Oct. 1, 2015

(65) Prior Publication Data
US 2018/0174401 A1    Jun. 21, 2018

(30) Foreign Application Priority Data
Mar. 26, 2014 (HK) .................................. 14102969

(51) Int. Cl.
*G07F 17/32* (2006.01)
*H04L 29/06* (2006.01)

(52) U.S. Cl.
CPC ...... *G07F 17/3262* (2013.01); *G07F 17/3209* (2013.01); *G07F 17/3223* (2013.01); *G07F 17/3267* (2013.01); *H04L 67/38* (2013.01)

(58) Field of Classification Search
None
See application file for complete search history.

(56) References Cited

U.S. PATENT DOCUMENTS

| 6,712,702 | B2 * | 3/2004 | Goldberg | G06Q 20/387 |
| | | | | 348/E7.071 |
| 8,287,379 | B2 | 10/2012 | Nguyen et al. | |
| 8,597,127 | B2 | 12/2013 | Nguyen et al. | |
| 9,269,215 | B2 * | 2/2016 | Thompson | G07F 17/3206 |
| 9,776,077 | B2 * | 10/2017 | Thompson | A63F 13/23 |
| 2005/0192099 | A1 * | 9/2005 | Nguyen | G06F 21/10 |
| | | | | 463/42 |

FOREIGN PATENT DOCUMENTS

| CN | 102739607 A | 10/2012 |
| CN | 103599635 A | 2/2014 |
| WO | 2013109897 A1 | 7/2013 |

* cited by examiner

*Primary Examiner* — Ronald Laneau
(74) *Attorney, Agent, or Firm* — Renner Kenner Greive Bobak Taylor & Weber

(57) ABSTRACT

A system and method for gaming includes the steps of receiving a user input for a wager game, wherein the user input is received through a communication network from an interface, the user input includes game play instructions and wagering information; processing the user input with a gaming module arranged to generate one or more game play results of the wager game, and transmitting one or more game output having the game play result and a wagering information associated with the game play result over the communication network to the interface.

18 Claims, 16 Drawing Sheets

SYSTEM AND METHOD FOR GAMING

TECHNICAL FIELD

The present invention relates to a system and method for gaming and particularly, but not exclusively, to a system and method for gaming using cloud computing technology.

BACKGROUND

Fuelled by the rapid advancement in gaming technologies and games developments, gaming systems have become one of the most popular forms of entertainment systems nowadays. To date, numerous types of gaming systems are available in the market. These gaming systems may generally be divided into portable type or non-portable type; and some of the gaming systems may have games integrated therein whilst some of the gaming systems may require the player to purchase the games separately.

No matter how the gaming system is built or constructed and independent of the game to be played, a gaming system is generally arranged to enable a game to be played by receiving game inputs from a player, and producing game outputs in response to the player's game inputs. Although the operation principle of the gaming system appears to be simple, the game itself may be more complicated as it may require the player to devise a particular strategy to win the game.

SUMMARY OF THE INVENTION

In accordance with a first aspect of the present invention, there is provided a method for gaming comprising the steps of: receiving a user input for a wager game, wherein the user input is received through a communication network from an interface, the user input includes game play instructions and wagering information; processing the user input with a gaming module arranged to generate one or more game play results of the wager game, and transmitting one or more game output having the game play result and a wagering information associated with the game play result over the communication network to the interface.

In a preferred embodiment of the first aspect, the gaming module is further arranged to be distributed on a cloud gaming arrangement.

In one embodiment of the first aspect, the gaming module includes one or more gaming components arranged to be distributed on the cloud gaming arrangement.

In one embodiment of the first aspect, the one or more gaming components includes a game processing routine arranged to process the user input so as to generate the one or more game output having the game play result.

In one embodiment of the first aspect, the game processing routine is further arranged to manage one or more game states of the wager game.

Preferably in one embodiment of the first aspect, the game processing routine is arranged to be processed on the cloud gaming arrangement.

In one embodiment of the first aspect, the game processing routine further includes a game management module arranged to generate or compose graphical or audio data associated with a graphical or audio representation of the one or more game play results or the one or more game states of the wager game.

In one embodiment of the first aspect, the method may further comprise the step of: transmitting the composed graphical or audio data over the communication network to the interface.

In a preferred embodiment of the first aspect, the interface may further comprise a graphics rendering module arranged to render graphics associated with the game play result using the composed graphical data received from the game processing routine or an audio generating module arranged to generate audio associated with the game play result using the composed audio data received from the game processing routine.

In a particular embodiment of the first aspect, the graphics rendering module may be arranged to render the composed graphical data onto a display as a graphical representation of the game play result or game state of the wager game.

In one embodiment of the first aspect, the interface further comprises an input module arranged to receive the user input and transmit the user input to the gaming module for processing.

In one embodiment of the first aspect, the gaming module further comprises a graphics or audio storage module for storing graphical or audio data associated with the one or more game play results or game states.

In one embodiment of the first aspect, the method may further comprise the step of: transmitting the graphical or audio data of one of the wager games over the communication network to the interface upon initialization.

In one embodiment of the first aspect, the gaming module further includes a random result generator.

Preferably in one embodiment of the first aspect, the random result generator is arranged to generate a random game result or a pseudorandom game result.

In one embodiment of the first aspect, the game result includes a bonus reward.

In a further embodiment of the first aspect, the bonus reward includes a wager bonus or a bonus game.

In one embodiment of the first aspect, the user input includes one or more of a game selection data, game play instructions, gaming data, wagering information, account information and player information.

In one embodiment of the first aspect, the gaming module further comprises a player management module arranged to manage user information or authenticate player identity.

In one embodiment of the first aspect, the gaming module further comprises an accounting module arranged to manage the wagering information associated with the players or the game play results of the games.

In a preferred embodiment of the first aspect, the cloud gaming arrangement comprises a plurality of computing devices arranged to operate on a distributed communication network.

Optionally in one embodiment of the first aspect, the gaming module may be arranged so that the wager game includes a return to player percentage (RTP %) that is equal or above a predetermined RTP %.

In accordance with a second aspect of the present invention, there is provided a system for gaming comprising a gaming module arranged to receive a user input having game play instructions and wagering information for a wager game from an interface through a communication network, process the user input so as to generate one or more game play results of the game, and transmit the one or more game output having the game play result and a wagering information associated with the game play result over the communication network to the interface.

In a preferred embodiment of the second aspect, the gaming module is further arranged to be distributed on a cloud gaming arrangement.

In one embodiment of the second aspect, the gaming module includes one or more gaming components arranged to be distributed on the cloud gaming arrangement.

In one embodiment of the second aspect, the one or more gaming components of the gaming module includes a game processing routine arranged to process the user input so as to generate the one or more game output having the game play result.

In one embodiment of the second aspect, the game processing routine is further arranged to manage one or more game states of the game.

Preferably in one embodiment of the second aspect, the game processing routine is arranged to be processed on the cloud gaming arrangement.

In one embodiment of the second aspect, the game processing routine further includes a game management module arranged to generate or compose graphical or audio data associated with a graphical or audio representation of the one or more game play results or the one or more game states of the wager game.

In one embodiment of the second aspect, the gaming module is further arranged to transmit the composed graphical or audio data over the communication network to the interface In a preferred embodiment of the second aspect, the interface further comprises a graphics rendering module arranged to render graphics associated with the game play result using the composed graphical data received from the game processing routine or an audio generating module arranged to generate audio associated with the game play result using the composed audio data received from the game processing routine.

In a particular embodiment of the second aspect, the graphics rendering module is arranged to render the composed graphical data onto a display as a graphical representation of the game play result or game state of the wager game.

In one embodiment of the second aspect, the interface further comprises an input module arranged to receive the user input and transmit the user input to the gaming module for processing.

In one embodiment of the second aspect, the gaming module further comprises a graphics or audio storage module for storing graphical or audio data associated with the one or more game play results or game states.

In one embodiment of the second aspect, the gaming module is further arranged to transmit the graphical or audio data of one of the wager games over the communication network to the interface upon initialization.

In one embodiment of the second aspect, the gaming module further includes a random result generator.

Preferably in one embodiment of the second aspect, the random result generator is arranged to generate a random game result or a pseudorandom game result.

In one embodiment of the second aspect, the game result includes a bonus reward.

In a further embodiment of the second aspect, the bonus reward includes a wager bonus or a bonus game.

In one embodiment of the second aspect, the user input includes one or more of a game selection data, game play instructions, gaming data, wagering information, account information and player information.

In one embodiment of the second aspect, the gaming module further comprises a player management module arranged to manage user information or authenticate player identity.

In one embodiment of the second aspect, the gaming module further comprises an accounting module arranged to manage the wagering information associated with the players or the game play results of the wager games.

In a preferred embodiment of the second aspect, the cloud gaming arrangement comprises a plurality of computing devices arranged to operate on a distributed communication network.

Optionally in one embodiment of the second aspect, the gaming module is arranged so that the wager game includes a return to player percentage (RTP %) that is equal or above a predetermined RTP %.

In accordance with a third aspect of the present invention, there is provided a system for gaming comprising: means for receiving a user input for a wager game, wherein the user input is received through a communication network from an interface, the user input includes game play instructions and wagering information; means for processing the user input with a gaming module arranged to generate one or more game play results of the wager game, and means for transmitting one or more game output having the game play result and a wagering information associated with the game play result over the communication network to the interface.

In accordance with a fourth aspect of the present invention, there is provided a computer readable medium containing program instructions for gaming, wherein the program instructions are arranged to: receive a user input for a wager game, wherein the user input is received through a communication network from an interface, the user input includes game play instructions and wagering information; process the user input with a gaming module arranged to generate one or more game play results of the wager game, and transmit one or more game output having the game play result and a wagering information associated with the game play result over the communication network to the interface.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
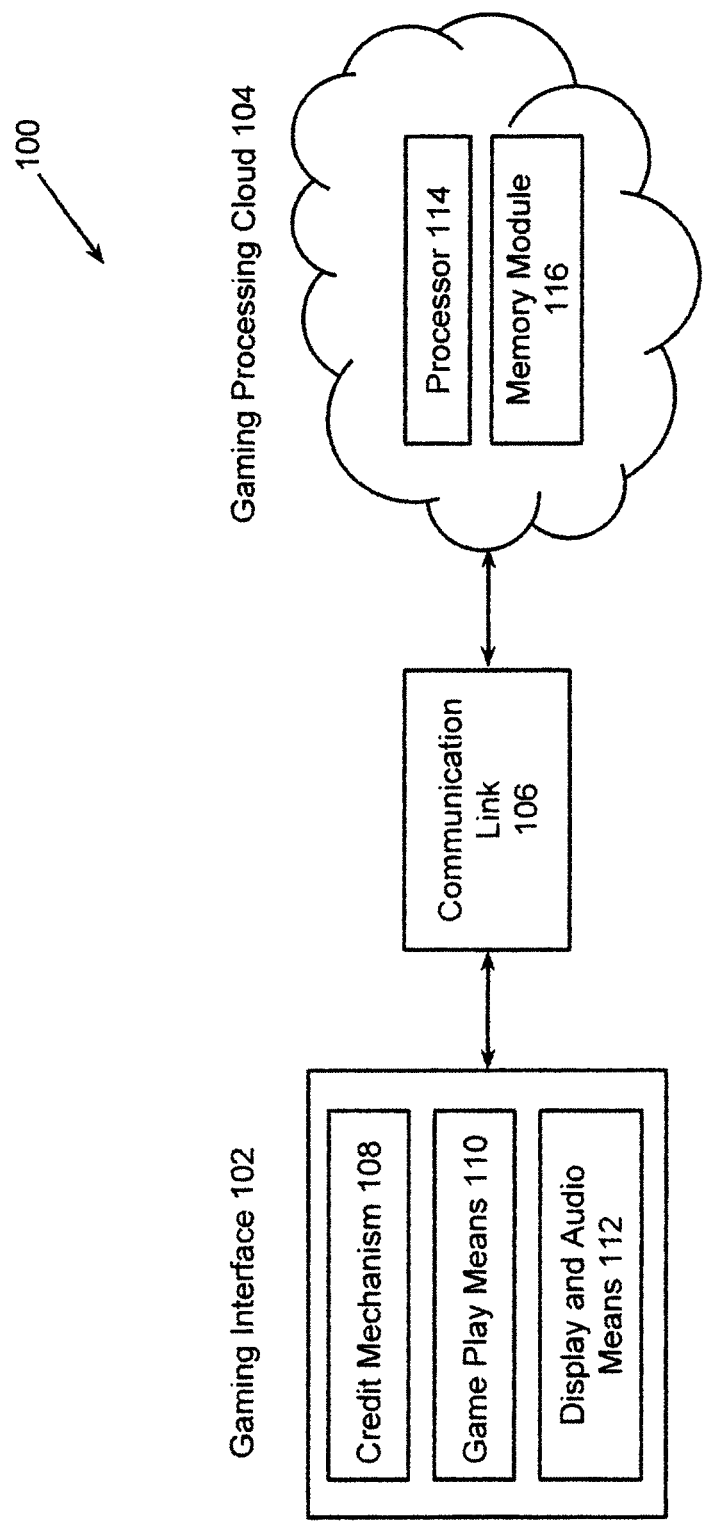
FIG. 1 is an overview of the core components of a gaming system comprising a gaming interface and a game processing cloud in accordance with an embodiment of the present invention.

Referring to FIG. 1, there is shown an overview of a computerized or electronic gaming system 100 having a gaming interface 102 and a game processing cloud 104 in data communication through a data communication link 106. Preferably, the game processing cloud 104 is arranged to possess one or more gaming components which may be implemented in software, hardware or both so as to provide a game in accordance with an embodiment of the present invention.

As shown in the embodiment of FIG. 1, the gaming interface 102 includes components arranged to enable mutual interaction between a player and the gaming system 100. In one example, the gaming interface 102 includes a credit mechanism 108 for receiving input credits from a player and distributing payouts; a game play means 110 for receiving game play information from the player for playing the game; and a display and audio means 112 for presenting gaming information to the player. In addition, the gaming interface 100 is further arranged to transmit the game play information/data to the game processing cloud 104 through the communication link 106 for processing and receive the processed game play information/data from the game processing cloud 104 through the communication link 106.

The game processing cloud 104 in FIG. 1 generally includes components arranged to communicate with the gaming interface 102 and process the game. Preferably, the game processing cloud 104 is distributed on individual software, hardware, or a combination of software and hardware components on a computer network such as a cloud computing arrangement or distributed computing arrangement.

As shown in FIG. 1, the game processing cloud 104 is in data communication with the gaming interface through a communication link for transmitting and receiving game play information and data to and from the gaming interface. Preferably, the gaming interface 102 is in data communication with the game processing cloud 104 through a wired or a wireless local network, which may be a public network, a corporate network, virtual private network (VPN) or other forms of wide area networks. More preferably, the data communication is made through a secured communication link.

The game processing cloud 104 further includes a processor 114 arranged to process the game play information, and a memory or storage module 116 arranged to store game graphics (e.g. graphics/audio data and information) associated with one or more games, game logic associated with the one or more games, player information, and wager information etc. In addition, the processor 114 of the game processing cloud 104 may be arranged to receive game play information from the gaming interface 102, process the game play information, and return the processed game play information including a game play result or a game output to the gaming interface 102 for presentation to the player.

Figure 2A:
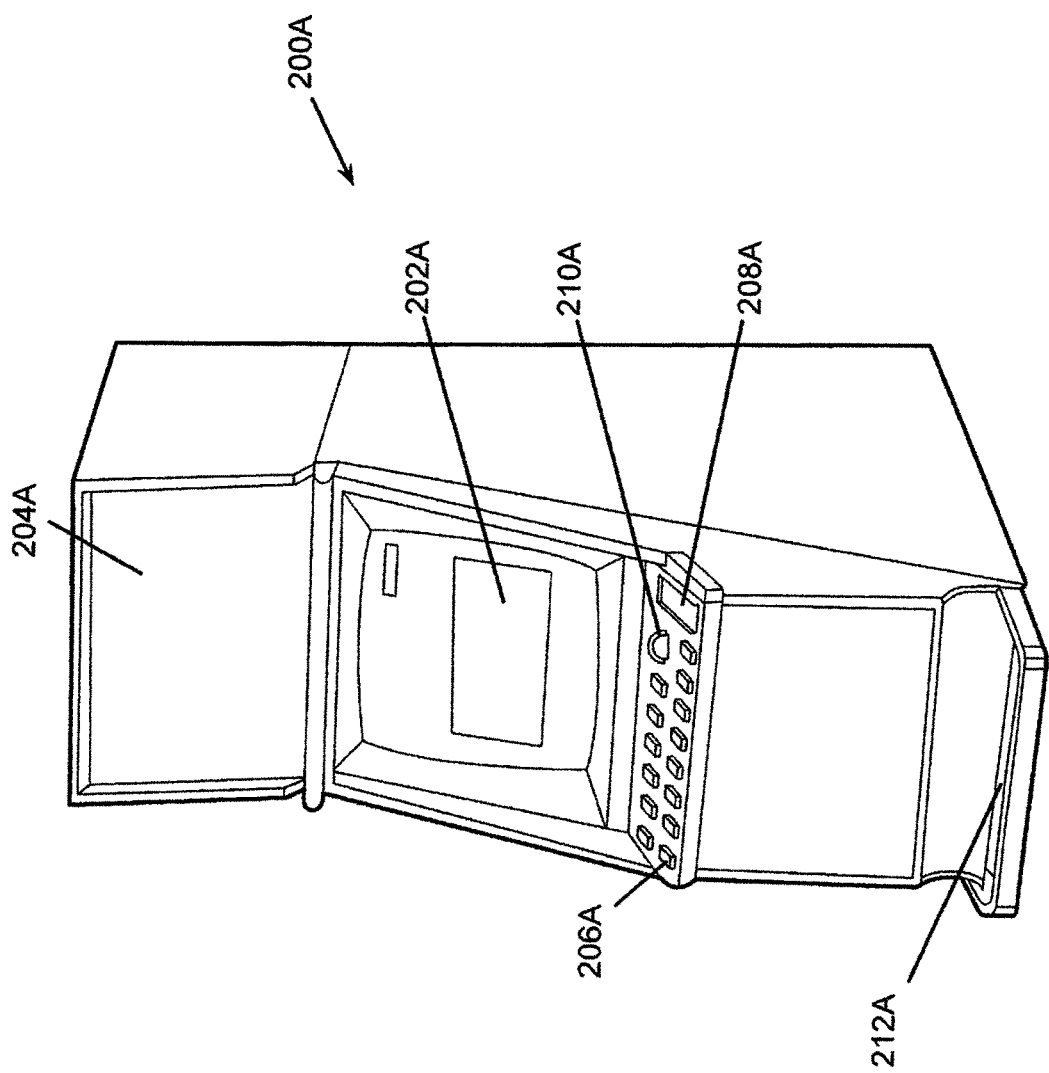
FIG. 2A shows a gaming machine in the form of a stand-alone machine which functions as a gaming interface of the gaming system of FIG. 1.

FIG. 2A shows a gaming machine 200A in the form of a stand-alone machine which functions as a gaming interface of the gaming system in accordance with one embodiment of the present invention.

As shown in FIG. 2A, the gaming machine 200A includes a console having a display screen 202A for displaying the game to the player. In addition, the gaming machine 200A may also include a further display 204A for displaying pay tables, bonus awards and other gaming graphics or information. In one embodiment, the display screen 202A may be a touch sensitive screen for allowing the player to interact with the gaming machine 200A. In one example, the display screen 202A and the further display 204A may be any suitable types of video/graphics display unit, such as but not limited to a CRT display, a LCD display or a plasma screen. The gaming machine 200A may also have one or more display screens arranged to display the game to the player.

Input buttons 206A, controllers or actuators are preferably provided on the gaming machine 200A so as to allow the player to interact with the gaming machine and hence to play the game. The gaming machine 200A may also include a credit input mechanism, which may be, for example, a bill collector 208A, a coin collector 210A, and a card reader (not shown) for reading an identification card, a credit card or a debit card. Alternatively, virtual currency may also be available through player identification and communication with appropriate clearing houses. In addition, a credit output mechanism is provided in the gaming machine for distributing payouts. The credit output mechanism may include a bill/coin tray 212A for distributing cash payouts from the gaming machine 200A. A marketing module with a reader or detector (not shown) may also be provided for reading a player tracking means in the form of a card, or other portable storage medium readable by the reader or detector so as to obtain/track player information in a loyalty program.

It should be noted that the gaming machine described above is merely exemplary and should not be considered limiting. For example, the gaming machine in some embodiments of the present invention may be arranged to operate, at least partially, as a slot machine, a fruit machine, and a poker machine. Other types of stand-alone gaming machines that do not include all the components as described above or with addition components may also function as a gaming interface in the gaming system of the present invention.

Figure 2C:
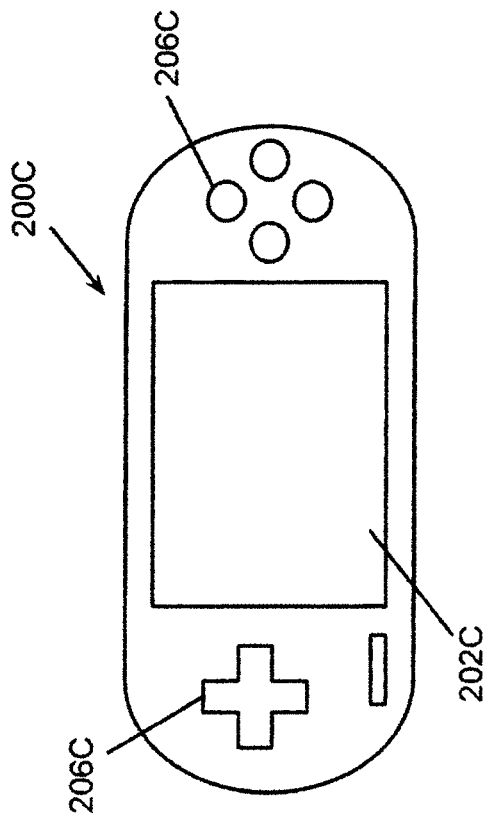
FIG. 2C shows a gaming machine in the form of a portable game playing device which functions as a gaming interface of the gaming system of FIG. 1.
Figure 2B:
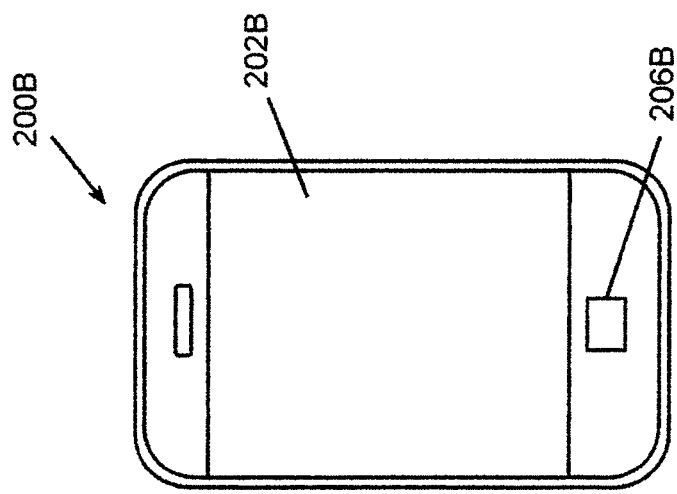
FIG. 2B shows a gaming machine in the form of a mobile communication device which functions as a gaming interface of the gaming system of FIG. 1.

FIG. 2B shows a mobile communication device 200B which functions as a gaming interface of the gaming system in accordance with one embodiment of the present invention. Preferably, the mobile communication device 200B in FIG. 2B comprises one or more buttons 206B and a touch sensitive screen 202B for receiving user input and displaying the game output. The mobile communication device 200B also includes a communication module for communicating data with a game processing network such as a game processing cloud through a communication link so as to enable a game to be played.

FIG. 2C shows a portable game playing device 200C which functions as a gaming interface of the gaming system in accordance with one embodiment of the present invention. In this particular embodiment, the portable game playing device 200C comprises a number of control buttons/switches 206C for receiving user input, and a display screen 202C for displaying the game. Optionally the display screen 202C may also be touch sensitive for receiving user input. In addition, the game playing device 200C further comprises a communication module for communicating data with a game processing network such as a game processing cloud so as to enable game play.

Figure 2D:
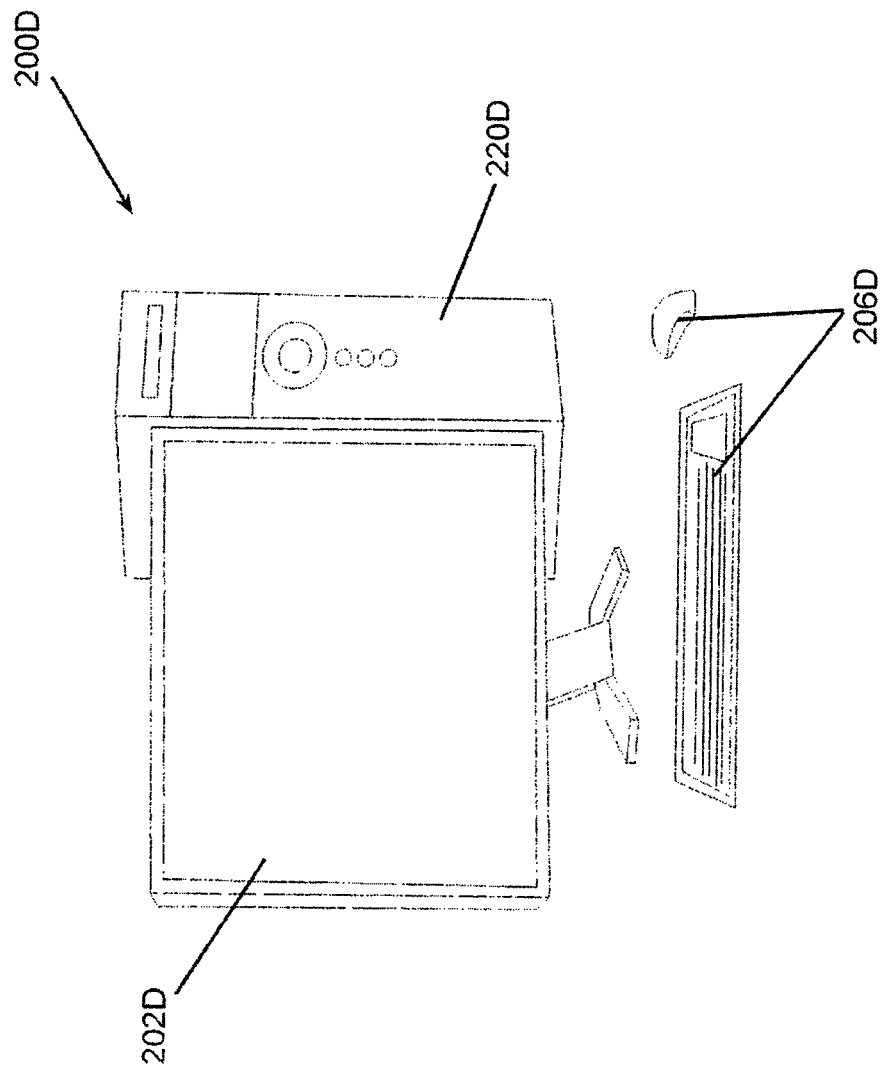
FIG. 2D shows a gaming machine in the form of a computer system which functions as a gaming interface of the gaming system of FIG. 1.

FIG. 2D shows a computer system 200D which may function as a gaming interface of the gaming system in accordance with one embodiment of the present invention. The exemplary computer system 200D in this embodiment comprises a display screen 202D for displaying the game, a keyboard and mouse 206D for the user to input game play information into the computer system, and a host machine 220D in communication with a computing network, e.g. a game processing cloud computing network, for processing the game. In a preferred embodiment, game processing is solely performed in the game processing cloud, and the computer system 200D is only arranged to be a gaming interface that receives game input from the player and returns game output processed at the game processing cloud to the player. Graphical rendering and audio generation is preferably performed in the computer system 200D by a graphical and audio processor such as a graphics card or a sound card or a sound synthesizer arranged to render a composed image or animation or generate sound based on composed sound data, although the graphical rendering and audio generation may also be performed in the game processing cloud. A skilled person in the art would readily appreciate that any types of computer system that is operable to receive user input, communicate with a cloud computing network, and display game output, may be arranged to operate as a gaming interface in the present invention.

Although not specifically shown in the Figures of 2A-2D, in a preferred embodiment, the gaming interfaces in these Figures may include a computer, a computing device, an electronic processing circuit, or any information handling systems. The computing device/information handling system may comprise any suitable components necessary to receive, store and execute appropriate computer instructions. These components may include a processing unit, a read-only memory (ROM), a random access memory (RAM), and input/output devices such as graphics or audio processors (e.g. graphics rendering card or sound synthesizer card), disk drives, input devices such as an Ethernet port, a USB port, etc.; a display such as a liquid crystal display, a light emitting display or any other suitable display; and communications links. The computing device/information handling system includes instructions that may be included in ROM, RAM or disk drives and may be executed by the processing unit. There may be provided a plurality of communication links which may variously connect to one or more other computing devices/information handling devices such as a server, personal computers, terminals, wireless or handheld computing devices. At least one of a plurality of communications link may be connected to an external computing network through a wired or wireless communications link. The computing device/information handling system may include storage devices such as a disk drive which may encompass solid state drives, hard disk drives, optical drives or magnetic tape drives. Also, the computing device/information handling system may use a single disk drive or multiple disk drives. Furthermore, the computing device/information handling system may also have a suitable operating system which resides, for example, on the disk drive or in the ROM of the computing device/information handling system.

Figure 3A:
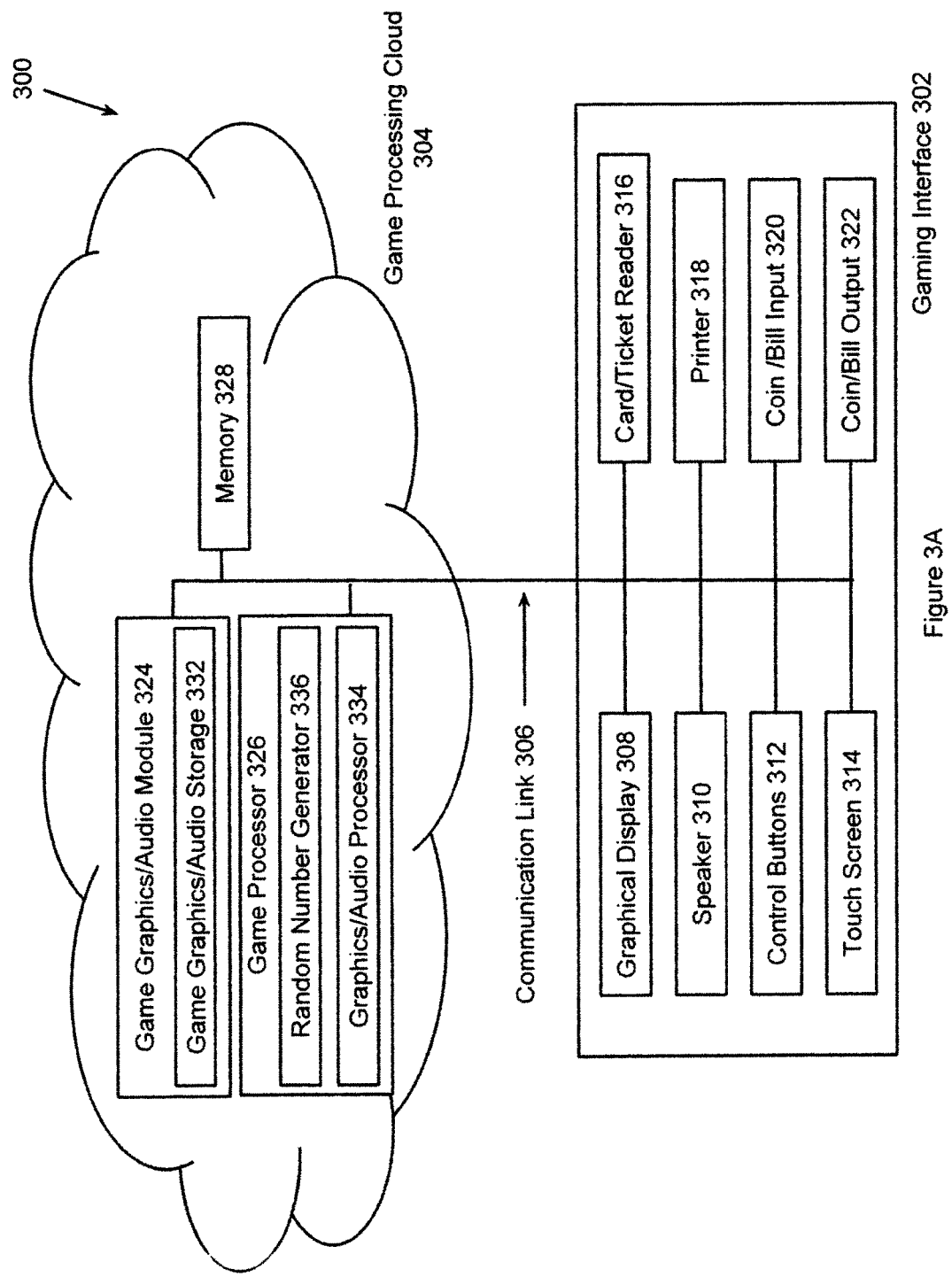
FIG. 3A is a block diagram showing the functional components of a gaming system comprising a gaming interface and a game processing cloud in accordance with one embodiment of the present invention.

FIG. 3A is a block diagram of the functional components in a gaming system 300 comprising a gaming interface 302 and the game processing cloud 304 in accordance with one embodiment of the present invention. As shown in FIG. 3A, the gaming interface 302 may be a gaming interface in communication with the game processing cloud 304 through a communication link 306. Preferably, the gaming interface 302 is in data communication with the game processing cloud 304 through a wired or a wireless local network, which may be a public network, a corporate network, virtual private network (VPN) or other forms of wide area networks.

In this embodiment, the gaming interface 302 includes a graphical display 308 for displaying graphical representation of the game; an audio output means such as a speaker 310 for outputting audio representation of the game; an input module with control buttons 312 and/or touch sensitive screen 314 for receiving game play instructions from the player; a card/ticket reader 316 for identifying a player; a printer 318 for printing materials relating to the game; a bill and/or coin acceptor 320 for receiving credits; and a bill and/or coin output mechanism 322 for distributing payouts for a wager game. In one embodiment, the bill and/or coin acceptor 320 may further comprise a currency detector for validating the bills or coins inputted by the user. It should be noted that other specific hardware or software may also be included in the gaming interface 302, and existing hardware in the gaming interface may be removed from the gaming interface 302 depending on the specific game to be handled by the gaming interface 302.

The game processing cloud 304 of FIG. 3A includes a game graphics/audio module 324, a game processor 326 and a memory or storage module 328. Preferably, the game processing cloud 304 is distributed on individual software, hardware or a combination of software and hardware components on a computer network such as a cloud computing arrangement or distributed computing arrangement.

As shown in FIG. 3A, the game graphics/audio module 324 includes a game graphics/audio storage 332 arranged to store game graphics/audio data associated with one or more games. In a preferred embodiment, a game graphics/audio processor module 334 is provided in the game processor 326 so as to process and compose graphics and audio associated with the game being played based on the one or more game play result.

Figure 3B:
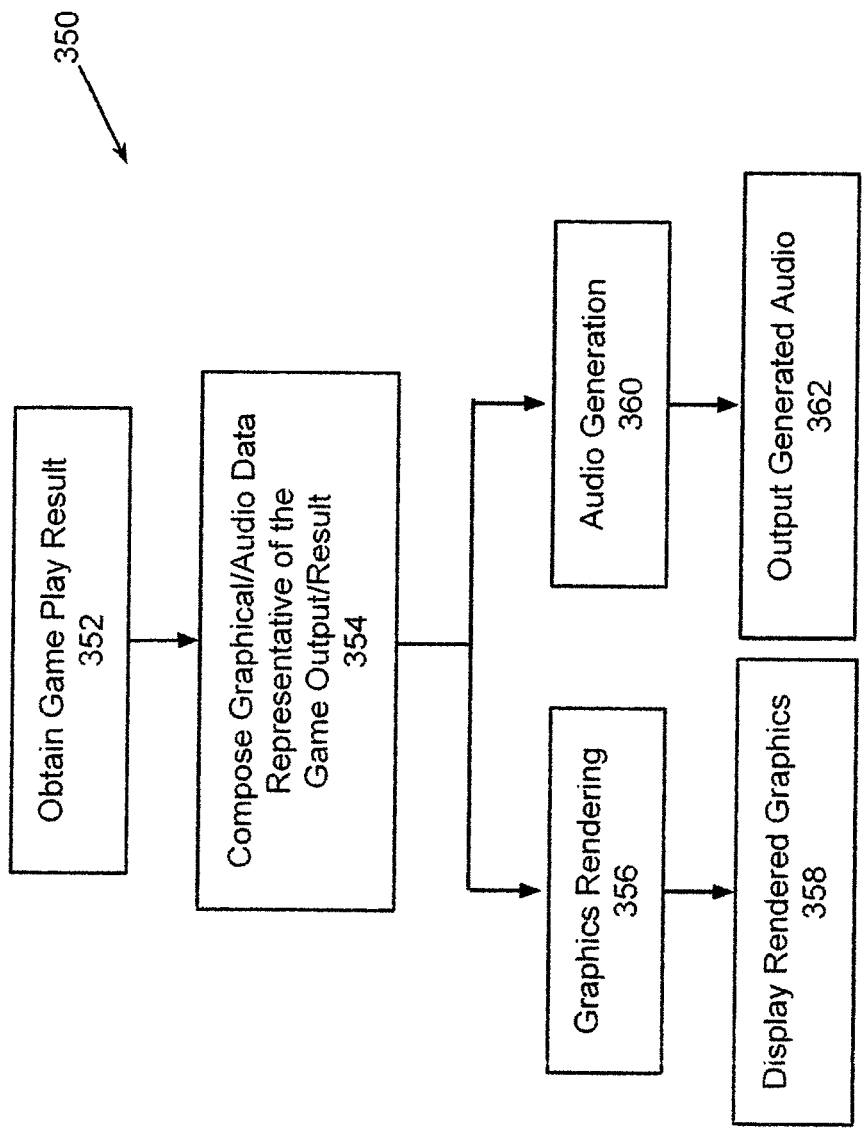
FIG. 3B is a block diagram showing a process for generating game graphics/audio associated with a game output/result based on the game output/result in accordance with one embodiment of the present invention.

FIG. 3B shows a detailed process 350 of how the graphics and audio associated with a game play result is generated in accordance with one embodiment of the present invention. Preferably, a game play result associated with the game is generated at step 352 in response to a game input from the player. Graphical/audio data arranged to represent the game play result is then composed based on the game play result as shown in step 354. Afterwards, the composed graphics and audio data are further processed for outputting to a gaming interface. Specifically, in steps 356 and 358, the composed graphical data associated with the game play result are rendered onto a display by using a graphical renderer (such as a graphics card on a computing device/information handling system). Meanwhile, in steps 360 and 362, the composed audio data associated with the game play result is generated at an audio generating device (such as a sound card or sound synthesizer on a computing device/information handling system) and the generated audio associated with the game play result is outputted to a speaker.

In the present embodiment, the game play result is generated at the game processing cloud 304. Also, the graphical and audio data associated with the game play result is composed at the game processing cloud 304. The composed game graphical and audio data is transmitted to the gaming interface 302 for graphical rendering and audio generation. In one embodiment, the rendered graphics and generated audio are presented to a player at the gaming interface 302 through the display 308 and the speaker 310.

Alternatively, the graphics/audio processor 334 in the game processing cloud 304 may be operable to compose as well as render and generate graphical and audio data specific to the game play result. The composed and generated/rendered game graphics and audio are then transmitted to the gaming interface 302 for output and hence display. In a further embodiment, part of the game graphics and audio may be composed, rendered and/or generated in the game processing cloud 304 whereas the remaining part of the game graphics and audio may be composed, rendered and/or generated in the gaming interface 302. In yet another embodiment, the game play result may be transmitted to the gaming interface 302 for composing, rendering and hence presentation to the player or the user.

In the present embodiment, the game processor 326 and the memory module 328 are arranged to receive the player input from the gaming interface 302; and process the player input or other game play information in accordance with gaming instructions implemented by hardware and/or software for outputting to the gaming interface 302. In a preferred embodiment, a random number generator 336 is included in the game processor 326 for generating random numbers or pseudorandom numbers for producing a random or pseudorandom game play result. Preferably, the game processor 326 and the memory module 328 are in communication with the input/output interface 330 in the game processing cloud 304. The input/output interface 330 may, for example, receive player information, gaming information, status information, account information, or other information related to the game from the gaming interface 302 and receive game play results, game outputs or other commands being sent to the gaming interface 302 from the game processing cloud 304.

It should once again be noted that the abovementioned hardware or software modules may be provided separately or combined whilst other hardware or software may also be included in or removed from the gaming interface and the game processing cloud without deviating from the spirit of the present invention.

Figure 4:
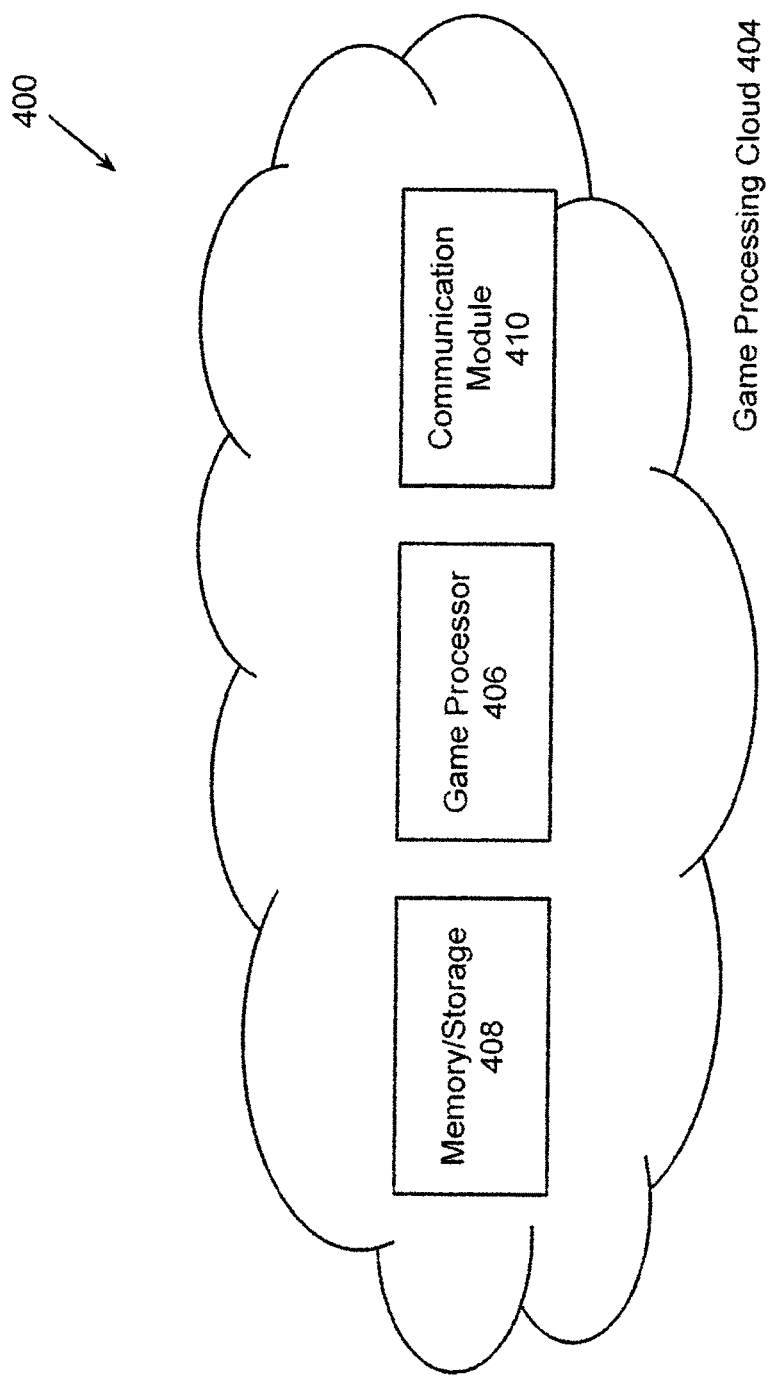
FIG. 4 shows the core functional components of the game processing cloud in accordance with one embodiment of the present invention.

Turning now to FIG. 4, there is shown a block diagram 400 of the core functional components of the game processing cloud 404 in accordance with one embodiment of the present invention.

Specifically, the game processing cloud 404 in FIG. 4 and in the present invention generally utilizes cloud computing technology for processing information related to the game and enabling game play. In one exemplary embodiment, the game processing cloud 404 in the present invention utilizes network based gaming concepts that utilize software running on one or more information handling systems interconnected via a communication network/link so as to form a game processing hardware platform. These information handling systems may be implemented with relevant software, hardware or both software and hardware that are arranged to be executed or processed on one or more computing devices or computers.

In one embodiment, these computing devices or computers generally include a server. The server may comprise any suitable components necessary to receive, store and execute appropriate computer instructions. The components may include a processing unit, a read-only memory (ROM), a random access memory (RAM), and input/output devices such as disk drives, input devices such as an Ethernet port, a USB port, etc.; a display such as a liquid crystal display, a light emitting display or any other suitable display; and communications links. The server includes instructions that may be included in ROM, RAM or disk drives and may be executed by the processing unit. There may also be provided a plurality of communication links which may variously connect to one or more computing devices/information handling devices such as a server, personal computers, terminals, wireless or handheld computing devices. At least one of a plurality of communications link may be connected to an external computing network through a wired or wireless communications link.

The server may further include storage devices such as a disk drive which may encompass solid state drives, hard disk drives, optical drives or magnetic tape drives. The server may use a single disk drive or multiple disk drives. The server may also have a suitable operating system which resides, for example, on the disk drive or in the ROM of the server. Optionally, the game processing cloud in the present invention may be a private cloud dedicated for a single organization, a community cloud for a group of organizations, a public cloud open for public, or a hybrid cloud with mixed cloud types.

Referring to FIG. 4, the game processing cloud 404 in the present invention generally includes a game processor 406, a memory/storage module 408, and a communication module 410, all of which may be virtual modules implemented by software processed by one or more processing units of one or more computing devices connected together within a cloud computing arrangement. The game processor 406 preferably includes the game logics, math models and a game processing engine for processing game play information to enable game play. For example, the game processor 406 is arranged to process player input received from a gaming interface. After processing this information, the game play result or a game output will be returned to the gaming interface and hence the player.

In a preferred embodiment, the game processor 406 is arranged to possess a gaming routine implemented, for example, on one or more processors of computer gaming software to perform game state management, player management and fund/accounts management. A random number generator may be included in the game processor 406 for generating random or pseudorandom numbers for use by the game processor. Game accounting meters for ensuring regulatory compliance and player credit monitoring (e.g. for enforcing a minimum or a maximum return-to-player ratio RTP %) may also be implemented in the game processor 406. The memory or storage module 408 of the game processing cloud may be arranged to store the game graphics/audio associated with the games to be played that are to be loaded into the gaming interface during game play. In one embodiment, the communication module 410 is arranged to communicate game play information/data between the game processing cloud 404 and the gaming interface. Preferably, the communication between the communication module of the game processing cloud 404 and the gaming interface is secured and encrypted.

Figure 5:
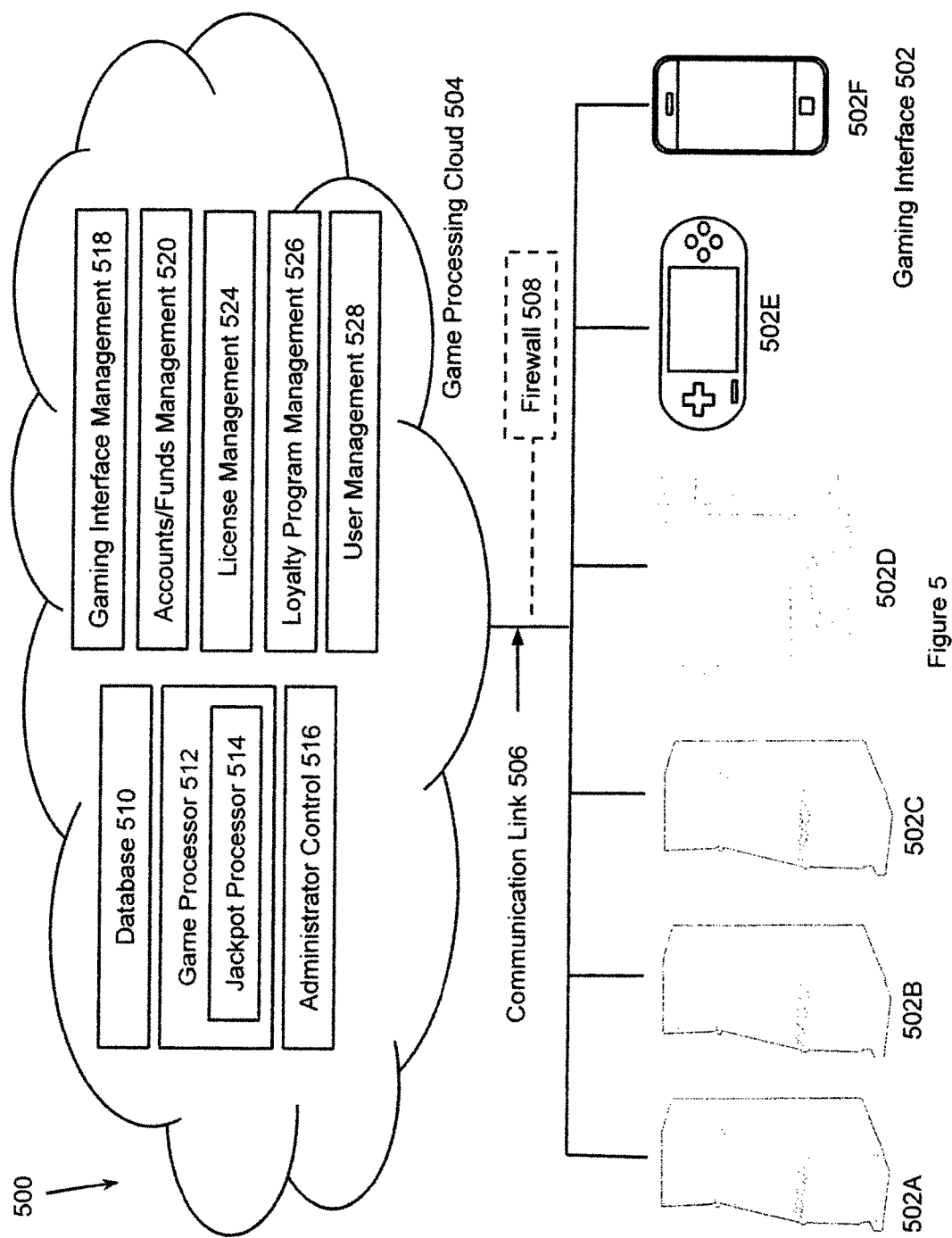
FIG. 5 shows a gaming network comprising a number of gaming interfaces connected with a game processing cloud in accordance with one embodiment of the present invention.

FIG. 5 shows an embodiment of a gaming network 500 comprising a number of gaming interfaces 502A-502F connected with a game processing cloud 504 through a network connection. In a preferred embodiment, the game processing cloud 504 is arranged to manage all gaming interfaces 502A-502F connected thereto and process game information simultaneously from more than one gaming interfaces. In the present embodiment, the gaming interfaces 502A-502F may be any of the gaming machines shown in FIGS. 2A-2D, or may be other gaming machines having similar or alternative functions. Also, the gaming network 500 may comprise any number of gaming interfaces connected with the game processing cloud 504. In one embodiment, the gaming interfaces 502A-502F may be arranged to communicate or interact with each other through the game processing cloud 504 and the communication link 506.

Preferably, the gaming interfaces 502A-502F are in data communication with the game processing cloud 504 through a wired or a wireless local network, which may be a public network, a corporate network, virtual private network (VPN) or other forms of wide area networks. More preferably, the data communication is made through a secured communication link which, for example, may be made by use of encryption technologies protected by a firewall 508.

A skilled person would appreciate that the present invention may be applied to play different kind of games, for example, card games, bingo, pin/ball games, or any other games. Furthermore, the games may be a wager game or a non-wager game, and may optionally include a jackpot prize. Furthermore, the games being played by the different gaming interfaces may be the same or may be different.

As shown in the embodiment of FIG. 5, the game processing cloud 504 comprises a number of core functional blocks. Preferably, a database 510 is provided in the game processing cloud 504 for storing audio and graphical game data, game logics, math models, and other gaming or processing instructions associated with different games available to be played. Preferably, at least portions of the audio and graphical data associated with one or more games are retrieved from the game processing cloud 504 and transferred to the gaming interface 502 for storage based on the one or more games selected by the player at the gaming interface 502 upon initialization. During game play, the graphical and audio data associated with a game play result may be composed by the game processing cloud 504 utilizing the graphical and audio data in the database 510 and then these composed graphical and audio data are transmitted to the gaming interfaces 502A-502F for graphics rendering and audio generation. Alternatively, the graphical and audio data may be composed and rendered at the game processing cloud 504 whilst the gaming interfaces 502A-502F merely display and output these graphical and audio representations of the game. In a further alternative, the composing and the rendering and generating function/process may be shared between the game processing cloud 504 and the gaming interfaces 502A-502F. In addition to the above function, the database 510 may further be arranged to store game play data, player information, funds/accounts information, loyalty program information, service information, license information or security information, although alternatively, these components such as the game play data, player information, funds/account information, loyalty program information, service information, license information or security information may also be partially or entirely provided as a service to the cloud rather than being stored on the database 510.

A game processor 512 is also provided in the game processing cloud 504 for processing games at different gaming interfaces. Preferably, the gaming interfaces 502A-502F in the gaming system functions so as to relay game input and output between the player and the game processing cloud 504. Specifically, in operation, the gaming interfaces 502A-502F receive player information, account information and game play information from the players and relays these information to the game processor 512 in the game processing cloud 504. The game processor 512, which in one example includes a game processing routine, such as the ones shown with reference to FIG. 7, will then process this information and return a game output or a game play result to the respective gaming interface 502A-502F, which is then presented to the player. Preferably, most if not all of the information associated with the player or the game is handled by the game processor 512 of the game processing cloud 504.

In some embodiments, the game being played may include a jackpot game, and therefore a jackpot handler 514 may be provided in the game processor 512 for handling this jackpot game. Nonetheless, it should once again be appreciated that the game processor 512 of the gaming processing cloud 504 are preferably implemented and operated on a network based cloud computing network and may be stored or processed by virtual servers implemented by software or hardware running on one or more physical information handling systems networked together.

An administrator control module 516 is preferably provided in the game processing cloud 504. The administrator control module 516 allows the administrator of the gaming system 500 to monitor and manipulate the gaming system. For example, the administrator control module 516 may allow the administrator to update the games by replacing the game audio/graphic data, the game logic, math model, etc. Furthermore, the administrator of the gaming system 500 may have control or access to the game play data, player information, funds/accounts information, loyalty program information, service information, license information, security information, etc. in the game processing cloud 504 as well as information/data in the gaming interfaces 502 for managing the gaming system.

In an exemplary embodiment, the administrator control module 516 includes a computing device or an information handling system connected to the game processing cloud through a network. The computing device/information handling system preferably includes any suitable components necessary to receive, store and execute appropriate computer instructions. The components may include a processing unit, a read-only memory (ROM), a random access memory (RAM), and input/output devices such as disk drives, input devices such as an Ethernet port, a USB port, etc.; a display such as a liquid crystal display, a light emitting display or any other suitable display; and communications links. The computing device/information handling system includes instructions that may be included in ROM, RAM or disk drives and may be executed by the processing unit. There may be provided a plurality of communication links which may variously connect to one or more computing devices/ information handling devices such as a server, personal computers, terminals, wireless or handheld computing devices. At least one of a plurality of communications link may be connected to a network such as a cloud computing network through a wired or wireless communications link. The computing device/information handling system may also include storage devices such as a disk drive which may encompass solid state drives, hard disk drives, optical drives or magnetic tape drives. The computing device/information handling system may use a single disk drive or multiple disk drives. The computing device/information handling system may also have a suitable operating system which resides, for example, on the disk drive or in the ROM of the computing device/information handling system.

As shown in FIG. 5, a gaming interface management module 518 may also be provided in the game processing cloud 504 to manage or coordinate the gaming interfaces 502A-502F connected to the game processing cloud 504 so as to facilitate game play in these gaming interfaces 502A-502F. In addition, an accounts/funds management module 520 arranged to manage player account information as well as wagering information and currency exchange associated with the games or the players may also be provided in the game processing cloud 504. A license management module 524 may be provided in the game processing cloud 504 so as to manage the licenses associated with the games or the gaming interfaces 502A-502F. Optionally, a loyalty program management module 526 may be provided in the game processing cloud 504 so as to manage a loyalty program associated with the players/users. A user management module 528 may also be provided such that the players/users may order drinks, food, or other services during game play.

Although the above modules are all arranged in the game processing cloud 504, in one embodiment, the gaming interfaces 502A-502F in the gaming system may also perform part of the function of these modules without deviating from the scope of the present invention.

Also, in one particular embodiment, further displays (not shown) connected to game processing cloud 504 and/or the gaming interfaces 502A-502F may be arranged to display bank information, game information or other promotional information associated with the games in a location proximal or remote from the gaming interfaces 502A-502F.

It should be noted that the abovementioned modules in the game processing cloud 504 may be provided independently or combined. Furthermore, other modules may also be included in the game processing cloud 504 whereas some existing modules in the game processing cloud 504 may be removed, depending on the specific gaming system implementation.

As previously described, the gaming network 500 in FIG. 5 may be arranged to implement various games. For example, the gaming network 500 in FIG. 5 may be arranged to implement a wager game that involves the display of spinning reels which stop at particular stop positions. On the display reels there may be different numbers, figures, alphabets, etc. A certain combination of symbols (e.g. numbers, figures, alphabets) in a row (not necessarily horizontal) or sequence when the spinning reels stops will results in a win line. In this exemplary game, the player may select the number of win lines of a plurality of win lines they will play in each game—i.e. a minimum of one win line up to the maximum number of win lines allowed by the game. Each win line is formed by a set of symbol positions consisting of one symbol position from each reel. That is, a predetermined symbol position of each reel is assigned to a win line. The symbol positions that constitute each of the win lines are usually advertised to the player by markings on the display or diagrams showing the symbol positions that correspond to each win line.

Figure 6:
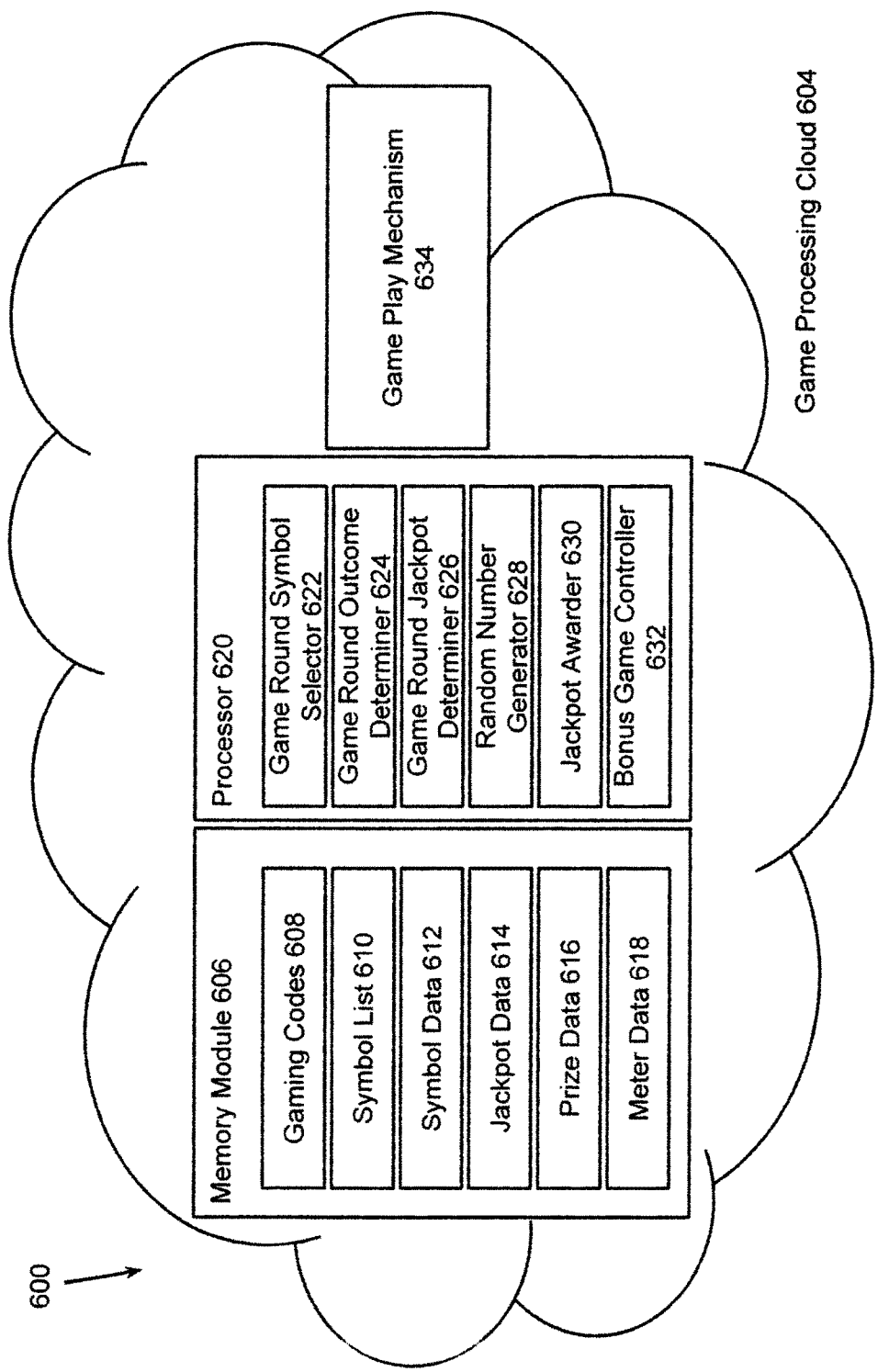
FIG. 6 shows the components of the game processing cloud for a particular game in accordance with another embodiment of the present invention.

FIG. 6 shows a block diagram 600 of the game processing cloud 604 in accordance with one embodiment of the present invention arranged to facilitate a game that involves the display of spinning reels. Preferably, the game processing cloud 604 includes a memory module 606, which may be a virtual memory module formed from one or more interconnected storage components or databases to store one or more games, each having its own game codes 608 arranged to be processed to operate the game, symbol list 610, symbol set data 612, jackpot data 614, prize data 616, and meter data 618. The game processing cloud 604 may also include a processor 620 having game round symbol selector 622, game round outcome determiner 624, and game round jackpot determiner 626 for paid games and free/bonus games. The game processing cloud 604 may also further include a random number generator 628, a jackpot awarder 630 and a bonus game controller 632. Preferably, a bonus game is awarded as a game output of the paid game. In one embodiment, a game play mechanism 634 is included in the game processing cloud 604 for managing and processing all game information or player instructions received from one or more gaming interfaces.

Figure 7:
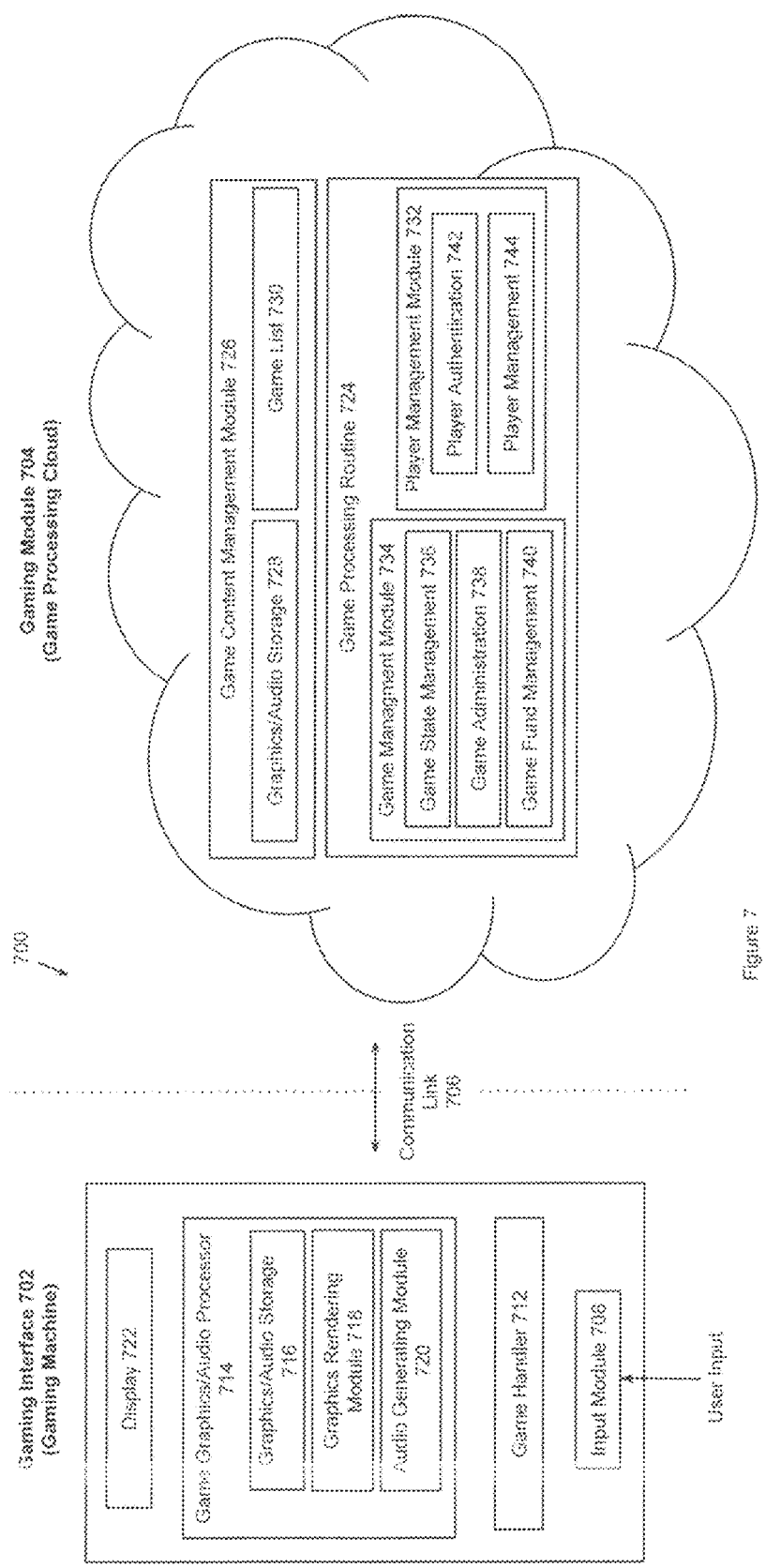
FIG. 7 shows a detailed block diagram of a gaming system comprising a gaming interface and a gaming module arranged to be distributed on a cloud based computing system that operates as a game processing cloud in a preferred embodiment of the present invention.

With reference to FIG. 7, there is shown a system for gaming comprising: a gaming module arranged to receive a user input having game play instructions and wagering information for a wager game from an interface through a communication network, process the user input so as to generate one or more game play results of the game, and transmit the one or more game output having the game play result and a wagering information associated with the game play result over the communication network to the interface.

FIG. 7 shows a detailed block diagram of a gaming system 700 in accordance with a preferred embodiment of the present invention. Specifically, the gaming system 700 comprises a gaming interface 702, which may for example be a gaming machine, as well as a gaming module, 704, which is preferably a game processing cloud. In a preferred embodiment, the gaming interface 702 is preferably in communication with the gaming module 704 arranged to be distributed on a cloud based computing system that operates as a game processing cloud via a communication link 706.

The gaming interface 702 in FIG. 7 includes an input module 708 arranged to receive a user input 710. For example, the input module 708 may comprise control buttons, actuators, touch screen, credit input mechanism, card readers, etc. that are arranged to receive user input 710 (game play instruction, wager information, player information, and account information, etc.) from the player. Furthermore, the gaming interface 702 includes a game handler 712 arrange to relay and send requests and information to the gaming module 704 upon receiving the user input 710. The game handler 712 may also be arranged to receive information such as game output, game play results, or other game related information and data from the game processing cloud 704.

In a preferred embodiment, a game graphics/audio processor 714 is provided in the gaming interface 702 for handling graphics and/or audio information/data related to the game. In particular, the game graphics/audio processor 714 includes a game graphics/audio storage module 716 arranged to store graphical and/or audio data related to a game prior to playing the game. In other words, the graphical and audio data of the game being played is local to the gaming interface 702 during game play. In addition, the game graphics/audio processor 714 further includes a graphics rendering module 718 and an audio generating module 720 arranged to render graphical representations of the game to the display 722 associated with the gaming interface 702 and generate audio representation of the game to an audio playing device (not shown) associated with the gaming interface 702. In a preferred embodiment, the graphics rendering module 718 and the audio generating module 720 may be a graphics processor or a sound synthesizer arranged to render the game graphics and generate game audio representative of different game states of the game. In these examples, as a game is being played, various game states and results of the game play may be generated by the gaming module 704. These game states and game play results may also be processed by the gaming module 704 so as to compose an image, animation, sound or a combination of one or more thereof. These composed images, animations, or sounds are in turn presented as graphical or audio data representative of the game play result or game state for graphics rendering or audio generation by the graphics rendering module 718 and the audio generating module 720 at the gaming interface 702.

Preferably, the graphics rendering module 718 and the audio generating module 720 are arrange to render game graphics and generate game audio by processing the graphical data stored in the gaming interface 702, with the game play result or game output received from the game processing cloud 704 after it has been determined and/or composed by a game processing routine 724 of the game processing cloud 704. In one example, the graphics rendering module 718 and the audio generating module 720 may include graphical and audio data such as store 2D sprites and Z sprites of the game graphics, animation models, rendering routines, lighting/colour models, audio script, raw audio files, audio generation model, or any other graphical rendering related and audio generation related information/data which are already stored and accessed by the graphics rendering module 718 and the audio generating module 720. These graphical and audio data may then be used to combine with a graphical and audio representation generated or composed by a game processing routine 724 of the game processing cloud 704 so as to render an image or an animation to a display or to generate an audio output to a speaker. In this process, the player playing the game at the gaming interface 702 is presented with a graphical display and an audio output associated with the game play result.

Alternatively, in another embodiment, the graphical and audio representation may be determined or composed at the gaming interface 702 based on the instructions associated with a game play result or game output received from the game processing cloud 704 and the graphical and audio data stored in the gaming interface 702. The composed graphical and audio representation is then rendered and generated at the gaming interface 702 so as to output game graphics and audio at different game states. In the present embodiment, the display 722 associated with the gaming interface 702 is arrange to display the rendered game graphics representative of the game play result or the game output, and the speaker (not shown) associated with the gaming interface 702 is arranged to output the generated game audio representative of the game play result or the game output to the user.

Referring to FIG. 7, there is shown a gaming module (game processing cloud) 704 in data communication with the gaming interface 702 through a communication link 706. The gaming module 704 in this embodiment is primarily arranged to handle most if not all game logic, math model, game instructions, game data, player information, account information, wager information, etc. The gaming module (game processing cloud) 704 in this preferred embodiment includes a game content management module 726 and a game processing routine 724.

The game content management module 726 comprises a graphics/audio storage module 728 and a game list 730. Preferably, the game list 730 includes a list of games of which the associated graphics and audio data are being stored in the graphics/audio storage module 728. Preferably, the list 730 also maintains a version of the game graphics/audio data such that the version of the game graphics/audio data being used or stored may be tracked or recorded. In one embodiment, the graphics and audio data of a game may be updated or removed by an administrator of the gaming system 700 who has access and control to the gaming module 704 (game processing cloud). The game content management module 726 is preferably arranged to distribute the game graphics and audio data to the gaming interface 702 on demand.

The game processing routine 724 in FIG. 7 further includes a player management module 732 and a game management module 734. The player management module 732 is primarily arranged to perform player authentication 742 as well as player management 744. In particular, the player management module 732 is arranged to validate and authenticate player identity, and manage information related to the player of the gaming interface 702. For example, the player information includes a player name, a player ID, a player game history, etc.

The game management module 734 in the gaming module (game processing cloud) 704 is arranged to perform game state management, game administration and game fund management. The game state management module 736 in this preferred embodiment is one of the core components in the gaming module (game processing cloud) 704 and is arranged to handle game logic, generate game play results using a random number generator, math model and different game configuration data from the game administration module 738. It should be noted that the game logic, the random number generator, and the math model may all be located or loaded in the game state management module 736, or alternatively, in any other components in the gaming module (game processing cloud) 704. In one embodiment, the game state management module 736 also manages game state data by performing in-game accounts/funds management. The game administration module 738 in one embodiment is arranged to manage the game configuration data including the return to player percentage (RTP %), wager settings, and different games to be processed at the game processing cloud for different gaming interfaces, etc. Preferably, the RTP % in the gaming system 700 in this embodiment may be arranged to be equal to, below or above a predetermined RTP % threshold. The game fund management module 740 is primarily arranged to manage the player's wagering information inputted into the game state management module 736 and the player's winning wager outputted from the game state management module 736. In one embodiment, a jackpot that involves a wagering prize may also be managed by the game fund management module 740.

Figure 8A:
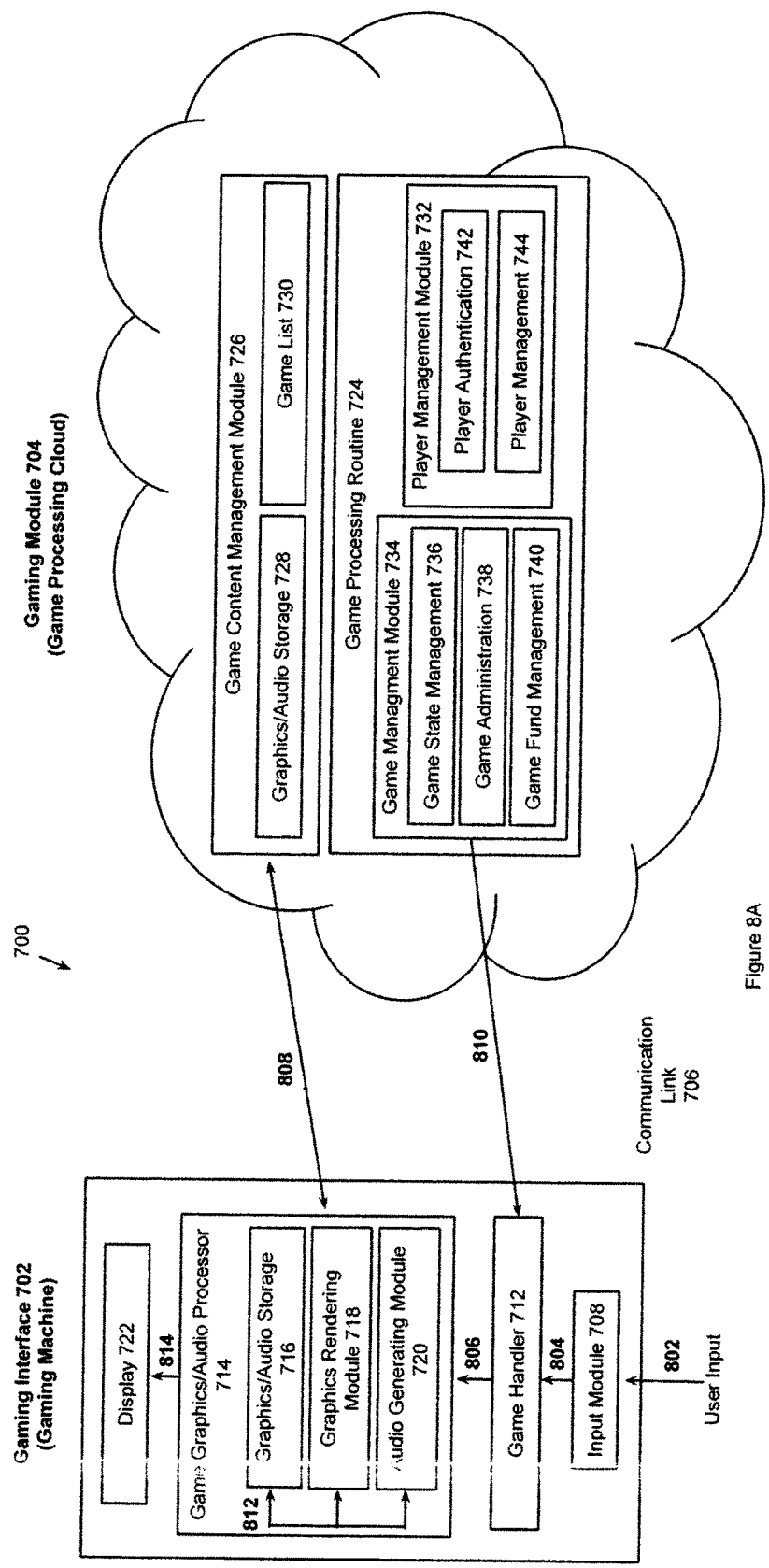
FIG. 8A illustrates the data flow in the gaming system of FIG. 7 upon initialization.
Figure 8B:
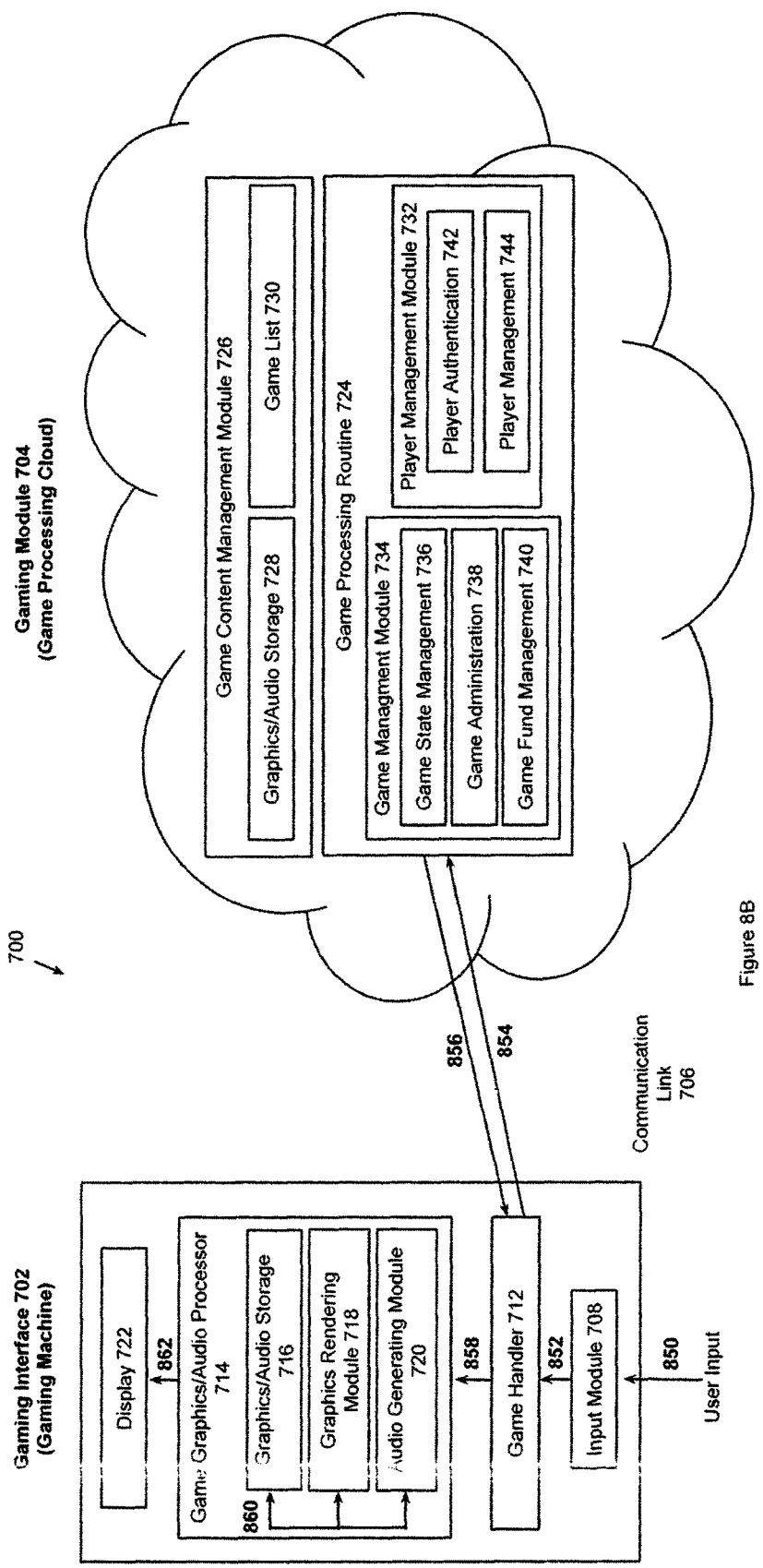
FIG. 8B illustrates the data flow in the gaming system of FIG. 7 during game play.

Referring to FIGS. 8A and 8B, there is shown a method for gaming comprising the steps of: receiving a user input for a wager game, wherein the user input is received through a communication network from an interface, the user input includes game play instructions and wagering information; processing the user input with a gaming module arranged to generate one or more game play results of the wager game, and transmitting one or more game output having the game play result and a wagering information associated with the game play result over the communication network to the interface.

FIG. 8A shows the operation of the gaming system 700 of FIG. 7 at initialization of the game. In this process, the user/player first provides a start game instruction as a user input 710 to the input module 708 to initiate the gaming interface 702 in step 802. Preferably, in this process the user selects a game from a list of games presented to the user at the display 722 of the gaming interface 702. Upon receiving the initiation command with the selected game from the user, in step 804, the input module 708 relays this information to the game handler 712, which in turn sends a launch game request to the game graphics/audio processor 714 in the gaming interface 702 as shown in step 806. The game graphics/audio processor 714, upon receiving the launch game request, then proceeds to step 808 to retrieve the graphical and audio data associated with the selected game from the game content management module 726 in the gaming module (game processing cloud) 704 through the communication link 706. Preferably, the game content management module 726 then looks for the selected game from the game list 730 and transmits the respective graphical/audio data associated with the selected game to the game graphics/audio storage module 716 in the game graphics/audio processor 714 at the gaming interface 702 for caching and storage of the game graphics/audio data if the game is on the game list 730. In cases where the game selected by the player is not available on the game list 730 of the gaming module (game processing cloud) 704, the game content management module 726 may return a message to the gaming interface 702 to notify the user of such failure and further requests the user to select another game.

Upon successful caching and storage of the game graphics/audio data in the game/audio storage module 716 in the gaming interface 702, the game processing routine 724 will be initialized or activated so as to initialize the game. Preferably upon initialization, the game processing routine 724 composes game graphics/audio associated with an initialization of the game (game start) and transmits these composed graphical and audio data to the game handler 712 of the gaming interface 702 in step 810, the game handler 712 of the gaming interface 702 in turn relays these composed graphical and audio data to the game graphics/audio processor 714. In step 812, the graphics rendering module 718 and the audio generating module 720 in the game graphics/audio processor 714 at the gaming interface 702 then renders and generates graphical and audio associated with the initialization of the game based on the graphical/audio data composed at the gaming module (game processing cloud) 704 and, in step 814, outputs graphical and audio representations of the game to the display 722 and speaker (not shown) at the gaming interface 702 so as to present a game start display and audio to the user and hence initiate the game play.

FIG. 8B shows an operation of the gaming system 700 of FIG. 7 upon successful initialization of the game. The following description describes the process of playing a wagering game in the gaming system. It should be noted that, however, any types of games, e.g. non-wagering games may also be played in the gaming system based on a similar process without departing from the scope of the invention.

In the game play process at steps 850 and 852, the user first inputs player information, game play instructions, wagering information, etc. through the input module 708 to the game handler 712. The game handler 712 then transmits these instructions and information to the game processing routine 724 in the gaming module (game processing cloud) 704 in step 854 through a network or a communication link 706. In one embodiment, the game handler 712 performs a preliminary processing to the player information, game play instructions and/or wagering information prior to transmission these instructions and information to the game processing routine 724. In one example, the game handler 712 receives the game play instructions such as a user's selection on the screen from the input module 708. Upon receiving or detecting the user's selection, which may have been made via a touch screen interface or any other physical or virtual input device, the game handler 712 processes information relating to the user's selection, such as, but not limited to, coordinates information relating to the selection (relative to the display) and convert or determines this coordinates information into a game play command or selection based on the mapping of the coordinates and the corresponding game play command.

The game processing routine 724, upon receiving these instructions and information, processes or further processes these instructions and information in the respective modules therein. In particular, the game state management module 736 processes the game play instructions received and in turn generates a game play result. Preferably, the game state management module 736 further composes graphical/audio data or instructions associated with the game play result as part of the game output. The game output comprising the game play results as well as the composed graphical/audio data or instructions associated with the game are then transmitted back to the game handler 712 at the gaming interface at step 856. In step 858, the game handler 712 then further relays these received information and data to the game graphics/audio processor 714. Depending on the game play result generated, as well as the composed graphical/audio data or instructions associated with the game play result, the graphics rendering module 718 and the audio generating module 720 then renders and generates the graphical and audio representation of the game state and game play result in step 860. Finally, in step 862, the graphical and audio representation of the game play result is transferred to the display 722 and the speaker (not shown) associated with the gaming interface 702 for notifying the player about the gaming result.

Figure 9:
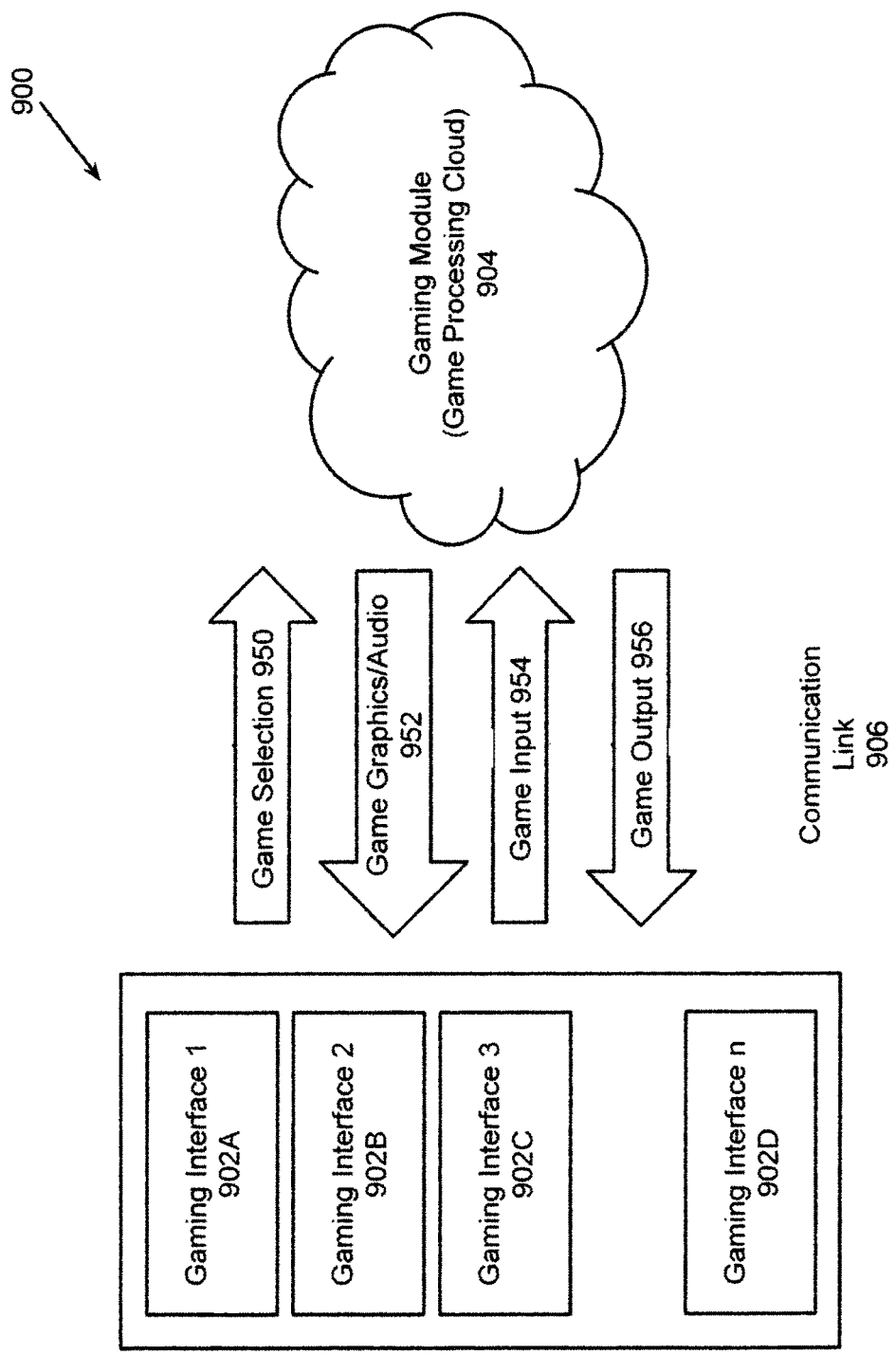
FIG. 9 is a block diagram showing a gaming network having a number of gaming machines connected to the gaming module (game processing cloud) of FIG. 7.

FIG. 9 shows a simplified block diagram of a gaming network 900 having a number of gaming interfaces 902A-902D which may, for example, be any of the aforementioned gaming machines. Preferably, each gaming interfaces 902A-902D in this embodiment forms a gaming system with the gaming module (game processing cloud) 904 in a similar manner as that described with regard to FIG. 7.

Preferably, these gaming interfaces 902A-902D are connected to the gaming module (game processing cloud) 904 through a data communication link 906. As shown in FIG. 9, the communication link 906 between the gaming interfaces 902A-902D and the gaming module (game processing cloud) 904 is arranged to relay game selection command 950, and graphical and audio information, data and instructions 952 related to the games between the gaming module (game processing cloud) 904 and the gaming interfaces 902A-902D, transmit the game inputs 954 received at the different gaming interfaces 902A-902D from the gaming interfaces to the gaming module (game processing cloud) 904, and output game output 956 or game play result from the gaming module (game processing cloud) 904 to the gaming interfaces 902A-902D. Specifically, the gaming module (game processing cloud) 904 are arranged to receive game selection commands 950 from different gaming interfaces 902A-902D and return the respective graphical and audio data associated with the selected games to the respective gaming interfaces 902A-902D for local caching or storage.

Preferably, all gaming interfaces 902A-902D are connected to the same game content management module in the gaming module (game processing cloud) 904 that receives the game selection commands 950, and all gaming instructions 954 inputted from different gaming interfaces 902A-902D are processed at the same game processing routine in the gaming module (game processing cloud) 904.

Figure 10:
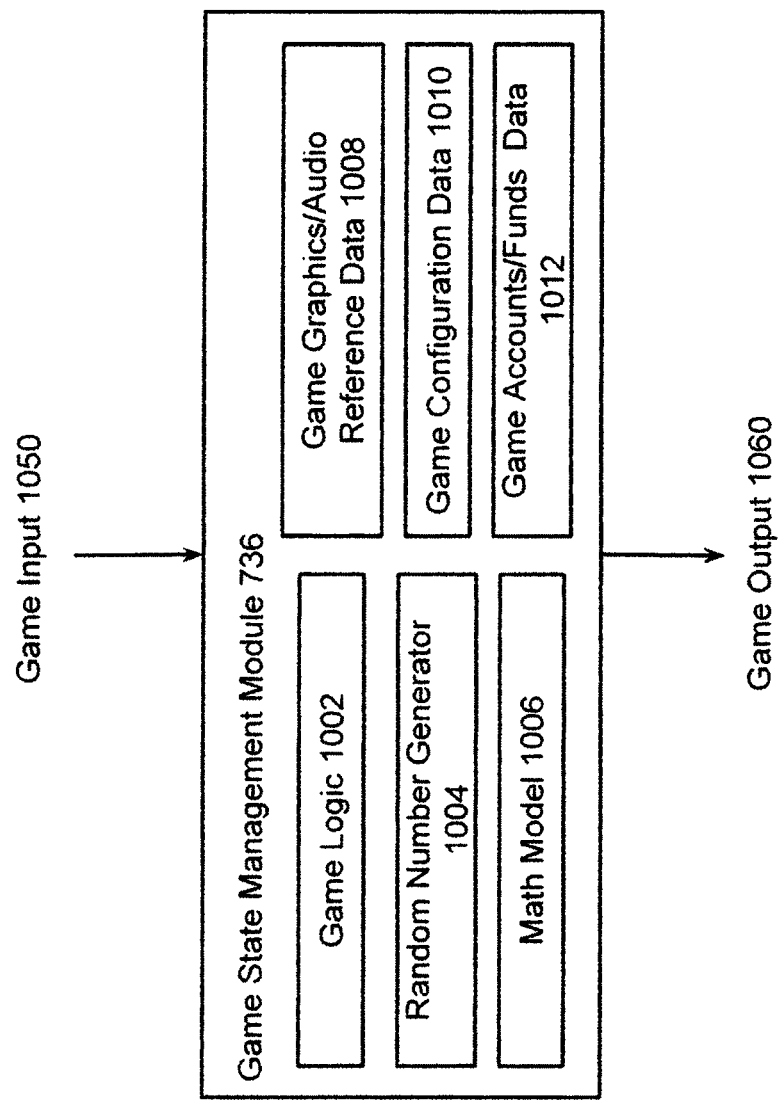
FIG. 10 is a detailed functional block diagram of the game state management module of FIG. 7.

FIG. 10 shows a detailed functional block diagram of the game state management module 736 of FIG. 7. As shown in FIG. 10, the game state management module 736 includes game logics 1002, a random number generator 1004, math models 1006, game graphics/audio reference data 1008, game configuration data 1010, as well as game accounts/funds data 1012 associated with the game being played. It should be noted that these functional modules may not be local to the game state management module 736 and may be retrieved from other modules in the gaming module (game processing cloud) 704 of FIG. 7 that are in communication with the game state management module 726. Nonetheless, FIG. 10 shows that the game input (e.g. player input/game play instructions) 1050 is first received at the game state management module 736. The game state management module 736 then generates a corresponding game play result based on the game logic 1002 associated with the game being played, the random result generated from the random number generator 1004, the math model 1006 associated with the game being played and the game configuration data 1010 associated with the game being played. Preferably, game graphics/audio reference data 1008 are provided in the game state management module 736 so as to determine and compose graphical and audio data or information associated with the game play result. In addition, the game accounts/funds data module 1012 in the game state management module 736 may also provide accounting or wagering information such as the wager won or lost in a wagering game based on the game play result. Therefore in this preferred embodiment, the game output 1060 comprises a game play result, together with the composed game graphical/audio data or information (e.g. graphics rendering instructions and/or audio generation instructions) associated with the game play result and/or the wagering information associated with the game play result. However, it is also possible in other embodiments that the game output 1060 may include further information (e.g. loyalty program information) associated with the game or the game play result.

Figure 11:
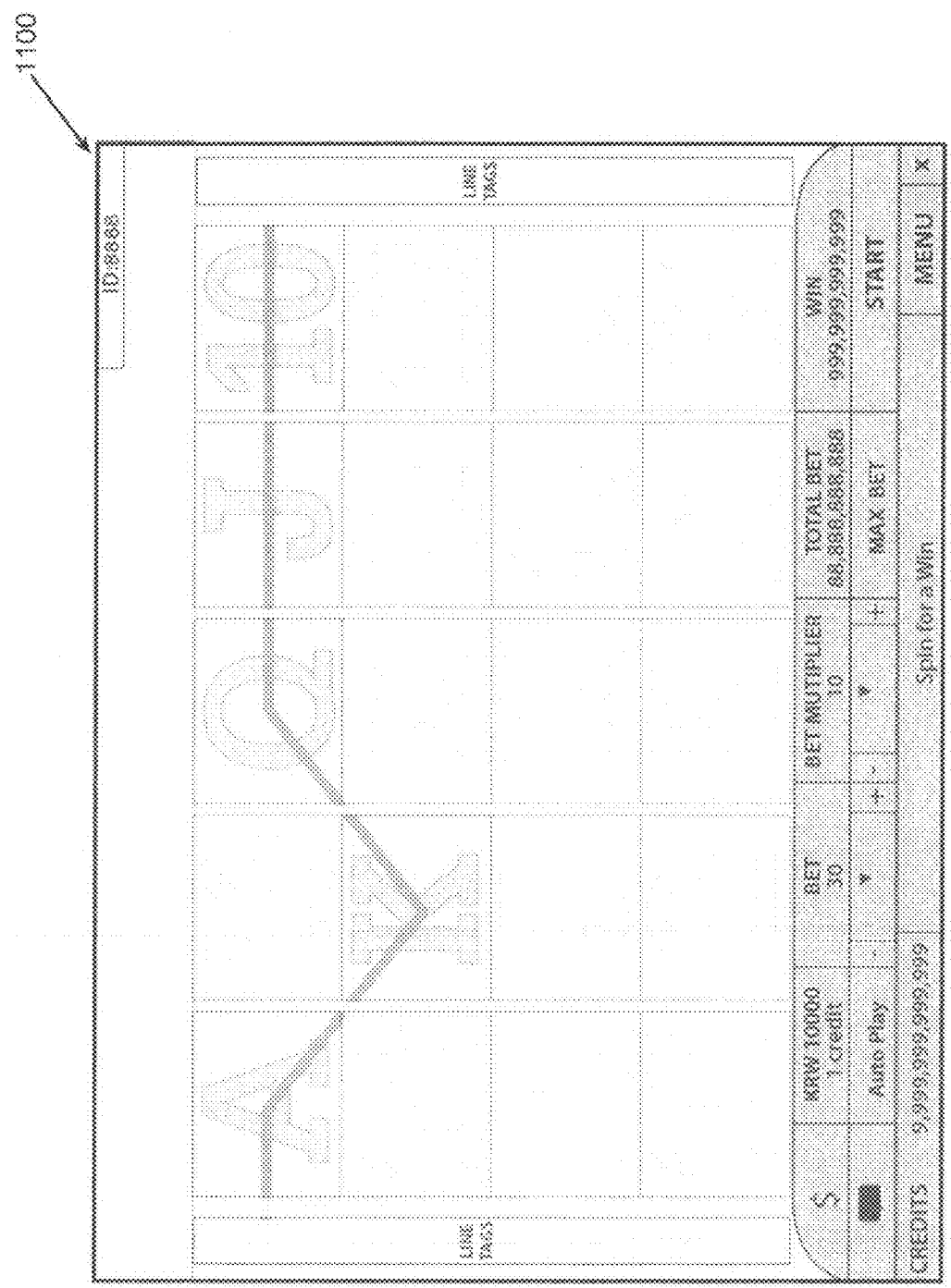
FIG. 11 is an exemplary screenshot of a game that is able to be played in the gaming system of FIGS. 1 and/or 7.

FIG. 11 shows an exemplary screen shot 1100 of the game able to be played in any of the gaming interface, gaming system or gaming network of the present invention. In this embodiment, the game as shown is wagering game that involves the display of spinning reels which stop at particular stop positions (details of the game has been described above). As shown in FIG. 11, the game comprises 3D graphics as well as animation of game play, all of which are preferably rendered at the gaming interface.

The basic steps of playing a game of the spinning reel as shown in FIG. 11 are as follows. First, the player selects the game and inputs the player identifier, account information, and/or credits (coins, bills or virtual currencies) at the gaming interface. Upon successful initiation of the game, the player then selects the number of win lines to be played (each win line corresponds to a certain combination of symbols in a row or sequence when the spinning reels stop) and the wager for the win lines for one game round. The total wager of each game round will preferably be automatically deducted from the credits owned by the player. Afterwards, the player initiates spinning of the spinning reel by pressing on a button or screen or other actuators. The final stopping position of the spinning reels will result in different combination of symbols in a sequence. A wager prize or a bonus game prize may be awarded if the sequence of the symbols matches some predetermined patterns of the selected game lines. Generally, each game line corresponds to a wager prize. In one example, a player selected ten game lines may have won five of the lines and lost the other five. In some cases, jackpot may be triggered as a result of a specific symbol sequence. After awarding the prize (if any), the player then initiates the next game round by selecting the number of win lines to be played and the wager for the win lines for the next game round. In the gaming process, all wagers are preferably automatically added to or deducted from the player's credit, which may be virtual currency that can be exchanged to coins and bills after the game.

Figure 12:
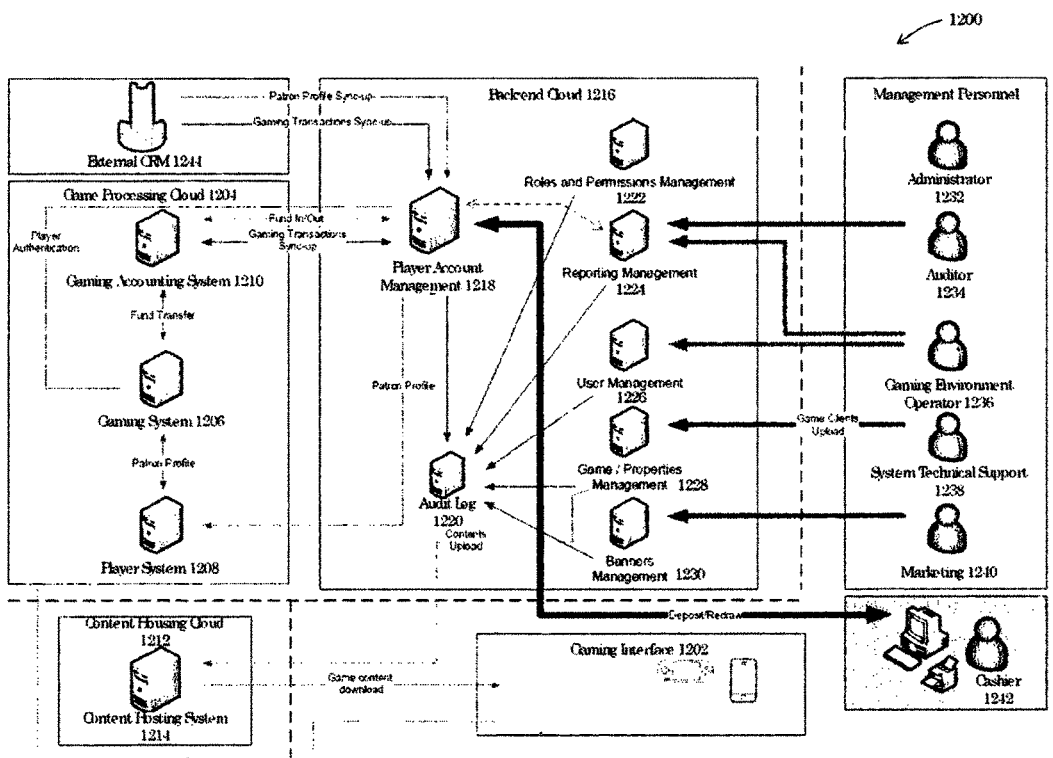
FIG. 12 shows a cloud based gaming system implemented in a gaming environment in accordance with one embodiment of the present invention.

FIG. 12 shows a cloud based gaming system 1200 implemented in a gaming environment in accordance with one embodiment of the present invention. In this embodiment, the gaming environment may be, for example, a gaming centre, club or a casino, implemented in a land-based, ship-based or a virtual environment. The games that may be played may also be wagering games or non-wagering games.

As shown in FIG. 12, the cloud based gaming system 1200 includes one or more gaming interfaces 1202 in data communication with a game processing cloud 1204. Preferably, this arrangement in the present embodiment is the same as the gaming interface and the game processing cloud arrangement described with respect to FIG. 1 or 7. In the present embodiment, the gaming interface 1202 may be any one of the gaming machine 200A, the mobile communication device 200B (e.g. phone, tablet, etc.), the portable game playing device 200C, or the computer system 200D as described with respect to and shown in FIGS. 2A-2D. Alternatively, the gaming interface 1202 may be any other types of information processing systems adapted to provide a gaming interface to the user and is operable to communicate data with various modules in the game processing cloud 1204 and/or the content housing cloud 1212.

In FIG. 12, the game processing cloud 1204 includes a gaming system module 1206, a player system module 1208 and a gaming accounting system module 1210 in data communication with one another. In a preferred embodiment, the game processing cloud 1204 in FIG. 12 is similar in terms of function and/or structure as the game processing routine 724 in FIGS. 7-8B.

In the present embodiment, the gaming system module 1206 in the game processing cloud 1204 is arranged to process game play instruction and/or game-related command received from the gaming interface 1202 for generation of a game play result or a game output to be outputted to the gaming interface 1202, with or without further processing of the game graphics or audio data. The generation and processing of graphics and/or audio related to the game or game play result in the system 1200 of the present embodiment may be the same as that previously described with respect to FIGS. 7-8B. In one embodiment, game graphics and audio may be rendered and generated by the gaming interface 1202 by processing the graphical data pre-loaded into the gaming interface 1202 based on game play result or game output received from the gaming system module 1206 of the game processing cloud 1204. Alternatively, the graphical and audio representation may be determined or composed at the gaming interface 1202 based on the instructions associated with a game play result or game output received from the game processing cloud 1204 and the graphical and audio data stored in the gaming interface 1202. It should be noted that other means or ways of game audio and graphics generation, rendering and processing are also possible without deviating from the scope of the present invention.

The gaming system module 1206 in the game processing cloud 1204 is preferably implemented, at least in part, to perform player authentication in addition to game play. In one embodiment, the gaming system module 1206 is arranged to receive an authentication request or related authentication information (e.g. account number/PIN/password, etc.) inputted by the player at the gaming interface 1202 and transmitted from the gaming interface 1202 to the game processing cloud 1204. Preferably, the authentication request or related authentication information is transmitted to the gaming system module 1206 before initiation of the game, and the game is only initiated (becomes playable) upon successfully verifying the authentication request or related authentication information. In one preferred embodiment, the gaming system module 1206 facilitates player authentication by communicating the authentication request or related authentication information inputted by the player at the gaming interface 1202 to the player account management module 1218 in the back-end cloud 1216, in which the player (or patron) profile data (e.g. name, account ID/number/PIN, ID number, phone number, email address, address, patron type, patron status, date of registration, game history, income band, household profile, ethnicity, game preference, interest, etc.) is hosted or stored, so as to perform authentication. In one simple example, the player account management module 1218 will check for whether the authentication information accompanying the authentication request, such as account name and password, is consistent with the data stored in the module 1218. As could be readily appreciated, a successfully authentication requires the inputted account name and password to match those recorded in the module 1218, although in other examples, additional information or methods, such as biometric checking, may be implemented to authenticate a player.

Upon successful authentication at the player account management module 1218 in the back-end cloud 1216, the player profile is transmitted partly (e.g. only the player ID/account ID etc.) or completely from the player account management module 1218 in the back-end cloud 1216 to the player system module 1208 in the game processing cloud 1204. In one embodiment, the player profile is pushed into the player system module 1208 by the player account management module 1218, although in other embodiments the player system module 1208 may be arranged to pull the player profile from the player account management module 1218. In the event that the authentication at the player account management module 1218 fails, the gaming system module 1206 may be notified by the player account management module 1218 (or by the player system module 1208 which fails to receive the player profile, or by determining an idle time period without response from the player system module 1208 or the player account management module 1218; or any other means) and the gaming system module 1206 may then identify the authentication as failed and request the player to re-enter the authentication information so as to initiate the game. Alternatively, if the authentication fails, the player account management module 1218 may attempt to pull player (patron) profiles from the external customer relationship management CRM module 1244 (which may have more updated player profiles) for updated player profile records to update its own player profile data. If the updated profile record then successfully authenticates the previously failed authentication request, the player account management module 1218 may provide the updated player profile to the player system module 1208 as described above.

The player system module 1208 in the game processing cloud 1204 is arranged to host or store the player (or patron) profiles retrieved from the player account management module 1218, and to record player activities, in particular game play activities (game play process, result, time, accounts, etc.). In a preferred embodiment, the player system module 1208 and the gaming system module 1206 are in data communication with one another for transmission of player (or patron) profile data such as player identity, player accounts, etc., so that the game play activities can be recorded for specific player profiles during game play. In one example, during authentication if the player system module 1208 fails to provide player (or patron) profile data to the gaming system module 1206, the gaming system module 1206 may either identify the authentication as failed and request the player to re-enter the authentication information at the gaming interface 1202 so as to repeat the authentication process for initiating the game; or initiate a request to the player system module 1208 for pulling player profile from the player account management module 1218 and/or the external CRM module 1244. Other ways for authentication is possible, as long as the player profile is eventually transmitted to the player system module 1208.

The gaming account system module 1210 in the game processing cloud 1204 is arranged to manage funds for individual players, player accounts and/or games. In the present embodiment, the funds may be in the form of virtual currencies for a wagering game. In other embodiments for non-wagering game, it is possible for the funds to be scores associated with the game.

In one embodiment, the gaming account system module 1210 is arranged to manage accounts for individual players or player accounts based on the wagering information (for a wagering game) transmitted from the gaming interface 1202 to the game processing cloud 1204 (e.g. the gaming system module 1206), the amount of funds in the player's account, and/or the game play result and/or the winning wager and losing wager reduction or even a bonus or jackpot prize outputted from the gaming system module 1206. In another embodiment, the gaming account system module 1210 may be arranged to manage a jackpot prize (e.g. determining the accumulated sum of jackpot for the same type of games that may be played across or by more than one gaming interfaces 1202) for the game. In a preferred embodiment, the gaming account system module 1210 is in data communication with the player account management module 1218 in the back-end cloud 1216 so as to communicate and synchronize funds information and gaming transactions information for individual players and games, as well as to manage a jackpot or bonus prize of one or more games. The accounts data/information in the gaming accounting system module 1210 may also be transmitted to the player account management module 1218 for managing funds for individual players/player accounts or games. In the present embodiment, the gaming account system module 1210 is preferably in synchronization with the player account management module 1218 so that account/fund information of different players/player accounts remains synchronized across these two modules, so that the player (patron) profile always contain the most updated account information for each individual player or player account. Preferably, the funds for individual players/player accounts in the player account management module 1218 and hence the gaming account system module 1210 may be updated when the player deposits further funds at the cashier 1242 (which may be a physical counter or a virtual module such as via e-payment).

In the present embodiment, it is preferred that the game processing cloud 1204 is mainly dedicated for game play (e.g. processing all data relating to the game/game play) to provide a fast response time of the game and hence an improved player experience to the player at the gaming interface 1202. In other words, in the present embodiment, other processing such as authentication, data recording, etc. which utilizes substantial system resources is preferably not performed in the game processing cloud 1204 but in the back-end cloud 1216.

FIG. 12 also shows a content hosting cloud 1212 with a content hosting system module 1214. In a preferred embodiment, the content hosting system module 1214 is the same as the game content management module 726 in FIGS. 7-8B. In the present embodiment, the content hosting system module 1214 is in data communication with the gaming interfaces 1202. Specifically, the content hosting system module 1214 may include a game list and a graphics/audio storage module (not shown). The game list may include a plurality of games of which the associated graphics and audio data are being stored in the graphics/audio storage module. In one embodiment, the list also maintains a version of the game graphics/audio data such that the version of the game graphics/audio data being used or stored may be tracked or recorded. By providing a content hosting system module 1214 that is separate from the gaming interfaces 1202, new/updated game graphics and audio data may be distributed to the gaming interface 1202 on demand, and graphics and audio data associated with an old game or a different game may be erased/overwritten in the gaming interface 1202 through transferring data from the content hosting system module 1214 to the gaming interface 1202.

In addition to the gaming interfaces 1202, the game processing cloud 1204, and the content hosting cloud 1212, the cloud based gaming system 1200 in FIG. 12 further includes a back-end cloud 1216 arranged with different modules for enabling an efficient and effective operation and back-end management of the cloud based gaming system 1200. Preferably, the back-end cloud 1216 is "isolated" from (but still in data communication with) the game processing cloud 1204, the content hosing cloud 1212, as well as the gaming interfaces 1202 with increased security measures such as firewalls, encrypted communication links, etc. In the present embodiment, it is imperative that the contents and/or data in the back-end cloud 1216 to be securely managed, communicated and stored.

As shown in the embodiment of FIG. 12, the back-end cloud 1216 includes a player account management module 1218 and an audit log module 1220 in communication with each other.

In the present embodiment, the player account management module 1218 hosts or stores the player (or patron) profile data (e.g. name, account ID/number/PIN, ID number, phone number, email address, address, patron type, patron status, date of registration, game history, income band, household profile, ethnicity, game preference, interest, etc.), and is operable to perform authentication prior to initiation of the game. As described above, the player account management module 1218 is in data communication with the gaming accounting system module 1210 in the game processing cloud 1204 to record the fund transactions and to perform gaming transactions synchronization for the player's accounts. The player account management module 1218 is also arranged to be in data communication with the gaming system module 1206 and the player system module 1208 in the game processing cloud 1204 for communicating player information or player authentication information with these modules so as to perform authentication, game play and player/player account record and maintenance purposes, also as described above. In one embodiment, the player account management module 1218 may also manage accounts for new players, i.e. players who open/create a new account associated with the gaming environment, at the cashier 1242 or through other online registration processes. Preferably, the player account management module 1218 may manages deposits and withdrawal of funds from the players' account in the system 1200. In one embodiment, the player may deposit or withdraw funds (or tokens) from his/her own account at the cashier 1242, which may be a physical cashier 1242 at the gaming environment (e.g. game centre or casino) or an online transaction of funds.

In one embodiment, the player account management module 1218 is also in communication with an external customer relationship management (CRM) module 1244 that is preferably managed separately. In this embodiment, the external customer relationship management module 1244 is arranged to communicate player profile information and/or gaming transaction information to the player account management module 1218 for synchronization. In one embodiment, new player accounts may be opened through an agent (e.g. webpage, personnel) that is outside the gaming environment. In this case, the record of the newly opened player account/profile may exist initially only at the external customer relationship management (CRM) module 1244. By synchronizing the external customer relationship management (CRM) module 1244 and the player account management module 1218, the new or updated record of the player account/profile may be provided to the player account management module 1218 to aid authentication.

Preferably, the external CRM module 1244 is operable to access information from the back-end cloud 1216 for management of the gaming environment. In one embodiment, the external CRM module 1244 is arranged to enable an operator of the gaming environment to analyse or use the large amount of data (including game play and non-game play data such as player profile) generated game-by-game, player-by-player, to provide better customer service through customization of the gaming environment or the services provided in the gaming environment. The external CRM module 1244 may also help to categorize customers so as to provide specifically targeted offers to a particular type or group of customers. In one embodiment, the external CRM module 1244 may also help to manage a player loyalty program. The external CRM module 1244 may serve other additional purposes but essentially it is arranged to improve the profit or the business or the popularity of the games and gaming environment in a preferred embodiment.

In the present embodiment, the player account management module 1218 in the present embodiment may be arranged to communicate with a reporting management module 1224 so as to facilitate the reporting of activity undertaken by users of the player account management module 1218. This is advantageous in that if critical data stored by the player account module 1218 is manipulated for unauthorized reasons, such manipulation can be detected and corrected to maintain compliance or integrity requirements.

With continuous reference to FIG. 12, the audit log module 1220 in the back-end cloud 1216 in the present embodiment is arranged to receive and log user activities (e.g. game related or non-game related) and, most importantly, updated accounts information from the player account management module 1218. In one embodiment, the audit log module 1220 in the back-end cloud 1216 includes a database for logging different types of events or information such as player/patron profile data, player account information, funds information, information associated with game play (e.g. game play instructions or commands, wager information, game play results, winning wager, losing wager, jackpot info, payout amount, jackpot prize, as well as time and date of these events, etc.). Essentially, the audit log module 1220 maintains a log of all funds-related events of the gaming system 1200.

In the present embodiment, the back-end cloud 1216 in the system 1200 further includes a role and permission management module 1222, a reporting management module 1224, a user management module 1226, a game properties management module 1228, and a banners management module 1230. In one embodiment, each of these modules may be in data communication with one another as well as the audit module 1220, although in a preferred embodiment, module 1224 is arranged to be in data communication with the player account management module 1218. Also, each of these modules 1222, 1224, 1226, 1228, 1230 may only be accessible by particular authorized personnel or user 1232, 1234, 1236, 1218, 1240. These personnel may be, for example, a physical person, or a web-based portal accessible by a person. A person skilled in the art would appreciate that these personnel would need to verify their identities (e.g. through using security means such as account PIN, password, facial/iris/fingerprint/vocal recognition, etc.) in order to access the modules 1222, 1224, 1226, 1228, 1230. Preferably, these modules 1222, 1224, 1226, 1228, 1230 are completely isolated from the players in the gaming system, and are only accessible by the management users or administrators (e.g. management personnel) of the system 1200.

In one embodiment, the roles and permissions management module 1222 in communication with the audit log module 1220 is arranged to be accessed and managed by an authorized system administrator 1232 to authorize the personnel who could operate the different modules in the cloud based gaming system 1200 and to change the permissions of these personnel with regard to the extent of which these personnel can access the system or data in the system 1200. Preferably, these permissions, commands or events inputted at the roles and permissions management module 1222 are logged.

The reporting management module 1224 in one embodiment of the present invention is arranged to be in communication with both the player account management module 1218 and the audit log module 1220; and is arranged to be accessed by an authorized auditor 1234 for auditing the funds and/or accounts associated with one or more player/patron accounts or games in the system 1200 in the gaming environment, such as by accessing the audit log module 1220 and/or the player account management module 1218. Preferably, the time, date and data accessed or changed by the auditor 1234 are logged.

An authorized gaming environment operator 1236 may be able to access the reporting management module 1224 as well as a user management module 1226, which may be in communication with the audit log module 1220. In one embodiment, the user management module 1226 may be accessed by the operator 1236 for managing users in the gaming system. It should be stressed that the term "user" referred to here is to, for example, the management or administration personnel and not to the players of the gaming system. In the present embodiment, the operator 1236 may for example add new management personnel or user to the system, changing the information related to individual management personnel or user, or deleting obsolete management personnel or user accounts. Preferably, an event log (including access time, date, and changes made, etc.) of the gaming environment operator 1236 accessing the user arrangement module 1226 is maintained. In one embodiment, the authorized gaming environment operator 1236 may also access and manage the reporting management module 1224 for accessing or managing the funds and/or accounts associated with one or more player/patron accounts or games in the system 1200 of the gaming environment. Again, an event log (including access time, date, and changes made, etc.) of the reporting management module 1224 being accessed by the environment operator 1236 may be stored.

As shown in FIG. 12, the game properties management module 1228 is in communication with the audit log module 1220, and is arranged to be managed by an authorized system technical support personnel 1238. In one embodiment, the system technical support personnel 1238 may upload games and their associated graphics and audio data through the game properties management module 1228 in the back-end cloud 1216 to the content hosting system module 1214 in the content housing cloud 1212. In one embodiment, the system technical support personnel 1238 may also upload a new version of the game or game graphics/audio data to the content hosting system module 1214 in the content housing cloud 1212, which is to be retrieved by the gaming interfaces 1202 from the content housing cloud 1212 prior to initiating game play. It would be appreciated that the system technical support personnel 1238 need not upload a whole new game for some of the updates in which only part of the game or game graphics/audio data is changed. Rather, the system technical support personnel 1238 can only upload the parts (of the game or game graphics/audio data) that need to be replaced to the content hosting system module 1214. Preferably, the game properties management module 1228 is in communication with the audit log module 1220 to maintain an event log (including access time, date, and changes made, etc.) of the system technical support personnel 1238.

Preferably, the banners management module 1230 in the back-end cloud 1216 is in communication with the audit log module 1220, and it may be managed by an authorized marketing personnel 1240 so that the marketing information or materials which may appear on the screen of the gaming interface 1202 during game play or when the game is idle or even before game play initiation can be uploaded to the content housing cloud 1212 for retrieval by the gaming interfaces 1202. The marketing information or materials may be an advertisement with graphics or static images with or without sound. Preferably, an event log (including access time, date, and changes made, etc.) of the marketing personnel 1240 accessing the banners management module 1230 is maintained and recorded.

A cashier 1242, which may be a physical counter or a virtual cash handling module such as e-payment systems may operate in the gaming environment. Preferably, the cashier 1242 has access to an information handling system operable to access the player account management module 1218 in the back-end cloud 1216 for enabling the player to withdraw or deposit funds. In one embodiment, when the player deposits funds at the cashier counter in the gaming environment, the funds/accounts information associated with the user in the player account management module 1218 and hence the other associated modules will be updated to reflect the change. Likewise for the case when the player withdraws funds from their account at the cashier counter. In another embodiment, it is possible for new accounts to be created at the cashier 1242, and the player profile associated with the new account is then transmitted to the player account management module 1218.

It should be noted that although in the above embodiments shown in FIG. 12, there is provided different cloud structures arranged with different modules for different purposes in the gaming environment, these cloud structures may be merged as one or may be further divided into separate cloud structures. It can be readily appreciate that the cloud structures in the present invention can be distributed on individual software, hardware, or a combination of software and hardware components on a computer network such as a cloud computing arrangement or distributed computing arrangement. It is also preferably that different cloud structures in the present embodiment are hosted in different cloud structures for improved security and system integrity.

Also, a person skilled in the art would appreciate that the data communication links among these modules may or may not be secured by encryption or other security measures. Of course all communication links in the system are preferably encrypted to a certain extent to provide additional safety and security. In a preferred embodiment, the communication links associated with or within the back-end cloud 1216 are of a higher level of encryption than other communication links, as the security of the back-end cloud is imperative to the operation of the system 1200. It is also possible that the different modules in the system 1200 which are arranged to be operated by different personnel in the gaming environment will maintain a log of access by individual personnel. Also, password or other identification means (e.g. account PIN, password, facial/iris/fingerprint/vocal recognition, etc.) may be used to authenticate the personnel who could operate the modules or to what extent could these personnel be authorized to operate or access the system.

A person skilled in the art would also appreciate that features and applications in different embodiments of FIGS. 1-12 in the present invention can be combined, separated, or are interchangeable, without departing from the spirit of the present invention.

The present invention discloses a system and method for playing a game using cloud computing technology. The embodiments of the present invention are particularly advantageous in that the game logics of different games are all maintained in the game processing cloud. This allows administrator-friendly maintenance of the games such that the update and replacement of the games will not have any effect on the operation of the gaming interface. Also as game processing is now performed in the game processing cloud, the gaming interfaces become more versatile as the number of games that can be played on these machines are no longer limited by local memory/storage.

In addition, the retrieval of the game graphics/audio data upon each initialization of the game or upon each game selection for local storage at the gaming interfaces significantly enhances the resource utilization efficiency at the gaming interfaces. This in turn may reduce the cost of manufacture of gaming interfaces, or enhance the performance of the gaming interface by minimizing load to the gaming interfaces.

The above advantages with regard to the gaming system in the present invention are only meant to be exemplary. Other advantages with regard to efficiency, effectiveness, cost, operation, function, structure and maintenance will be apparent to a person skilled in the art upon reading the specification and will not be described in further detail below.

It should be noted that various gaming interfaces, gaming systems, and gaming networks described in the present invention are complementary to each other. In other words, gaming interfaces, gaming systems, and gaming networks of different Figures can be used interchangeably or in combination without departing from the spirit of the present invention. Similarly, the game processing cloud described in various parts of the specification is complementary to each other and they may be used interchangeably or in combination without departing from the spirit of the present invention. The same also applies to modules with similar or consistent terminologies throughout the specification.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for gaming comprising the steps of:
receiving, from an interface through a communication network, a user input for a wager game, the user input including game play instructions and wagering information;
processing the user input with a gaming module arranged to generate one or more game play results of the wager game, the gaming module including:
one or more gaming components arranged to be distributed for operation on a cloud gaming arrangement, the one or more gaming components including:
a game processing routine arranged to:
process the user input to generate one or more game outputs having the one or more game play results, and
manage one or more game states of the wager game; the game processing routine further including:
a game management module arranged to generate and compose:
a graphical data associated with a graphical representation of the one or more game play results or the one or more game states of the wager game; or an audio data associated with an audio representation of the one or more game play results or the one or more game states of the wager game;

transmitting the one or more game outputs having the one or more game play results and a wagering information associated with the respective game play result through the communication network to the interface; and transmitting the composed graphical data or the composed audio data through the communication network to the interface.

2. The method for gaming in accordance with claim 1, wherein the interface further comprises a graphics rendering module arranged to render graphics associated with the game play result using the composed graphical data received from the game processing routine or an audio generating module arranged to generate audio associated with the game play result using the composed audio data received from the game processing routine.

3. The method for gaming in accordance with claim 2, wherein the graphics rendering module is arranged to render the composed graphical data onto a display as a graphical representation of the game play result or game state of the wager game.

4. The method for gaming in accordance with claim 1, wherein the interface further comprises an input module arranged to receive the user input and transmit the user input to the gaming module for processing.

5. The method for gaming in accordance with claim 1, wherein the gaming module further comprises:
a graphics storage module for storing graphical data associated with the one or more game play results or the one or more game states, and
an audio storage module for storing audio data associate with the one or more game play results or the one or more game states.

6. A method for gaming in accordance with claim 5, further comprising one or more of the step of:
transmitting the graphical data associated with the wager games through the communication network to the interface upon initialization, or
transmitting the audio data associated with the wager game through the communication network to the interface upon initialization.

7. A method for gaming in accordance with claim 1, wherein the user input further includes one or more of game selection data, gaming data, account information, and player information.

8. A method for gaming in accordance with claim 1, wherein the gaming module is arranged so that the wager game includes a return to player percentage (RTP %) that is equal or above a predetermined RTP %.

9. A system for gaming comprising:
a gaming module arranged to:
receive, from an interface through a communication network, a user input having game play instructions and wagering information for a wager game,
process the user input to generate one or more game play results of the wager game, and
transmit one or more game outputs having the one or more game play results and wagering information associated with the respective game play result through the communication network to the interface;
wherein the gaming module includes:
one or more gaming components arranged to be distributed for operation on a cloud gaming arrangement, the one or more gaming components including:
a game processing routine arranged to:
process the user input to generate the one or more game outputs having the one or more game play results,
manage one or more game states of the wager game, the game processing routine further including
a game management module arranged to generate or compose:
a graphical data associated with a graphical representation of the one or more game play results or the one or more game states of the wager game, or
an audio data associated with an audio representation of the one or more game play results or the one or more game states of the wager game;
wherein the gaming module is further arranged to transmit the composed graphical data or the composed audio data through the communication network to the interface.

10. A system for gaming in accordance with claim 9, wherein the interface further comprises a graphics rendering module arranged to render graphics associated with the game play result using the composed graphical data received from the game processing routine or an audio generating module arranged to generate audio associated with the game play result using the composed audio data received from the game processing routine.

11. A system for gaming in accordance with claim 10, wherein the graphics rendering module is arranged to render the composed graphical data onto a display as a graphical representation of the game play result or game state of the wager game.

12. A system for gaming in accordance with claim 9, wherein the interface further comprises an input module arranged to receive the user input and transmit the user input to the gaming module for processing.

13. A system for gaming in accordance with claim 9, wherein the gaming module further comprises:
a graphics storage module for storing graphical data associated with the one or more game play results or the one or more game states, or
an audio storage module for storing audio data associated with the one or more game play results or the one or more game states.

14. A system for gaming in accordance with claim 13, wherein the gaming module is further arranged to:
transmit the graphical data associated with the wager game through the communication network to the interface upon initialization, or
transmit the audio data associated with the wager game through the communication network to the interface upon initialization.

15. A system for gaming in accordance with claim 9, wherein the user input further includes one or more of game selection data, gaming data, account information, and player information.

16. A system for gaming in accordance with claim 15, wherein the gaming module further comprises at least one of:
a player management module arranged to manage player information or authenticate player identity, and an accounting module arranged to manage wagering information associated with the players or the game play results of the wager game.

17. A system for gaming in accordance with claim 9, wherein the cloud gaming arrangement comprises a plurality of computing devices arranged to operate on a distributed communication network.

18. A system for gaming in accordance with claim 9, wherein the gaming module is arranged so that the wager game includes a return to player percentage (RTP %) that is equal or above a predetermined RTP %.

\* \* \* \* \*